US010310896B1

(12) United States Patent
Kichak et al.

(10) Patent No.: US 10,310,896 B1
(45) Date of Patent: Jun. 4, 2019

(54) TECHNIQUES FOR JOB FLOW PROCESSING

(71) Applicant: SAS Institute Inc., Cary, NC (US)

(72) Inventors: John Michael Kichak, Raleigh, NC (US); Edward L. Rowe, Cary, NC (US); James Edward Georges, Irvine, CA (US); Daniel Thomas Kelly, Raleigh, NC (US); Glenn Daniel Sidle, Raleigh, NC (US); Charles Michael Cavalier, Apex, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/219,036

(22) Filed: Dec. 13, 2018

Related U.S. Application Data

(60) Provisional application No. 62/679,516, filed on Jun. 1, 2018, provisional application No. 62/643,386, filed on Mar. 15, 2018.

(51) Int. Cl.
G06F 9/46 (2006.01)
G06F 9/48 (2006.01)
G06F 9/50 (2006.01)

(52) U.S. Cl.
CPC .......... *G06F 9/4881* (2013.01); *G06F 9/48* (2013.01); *G06F 9/4843* (2013.01); *G06F 9/4887* (2013.01); *G06F 9/50* (2013.01); *G06F 9/5027* (2013.01); *G06F 9/5038* (2013.01); *G06F 2209/484* (2013.01)

(58) Field of Classification Search
CPC ........ G06F 9/48; G06F 9/4843; G06F 9/4881; G06F 9/4887; G06F 9/50; G06F 9/5027; G06F 9/5038
See application file for complete search history.

(56) References Cited

U.S. PATENT DOCUMENTS 4,852,001 A 7/1989 Tsushima et al.
4,896,269 A 1/1990 Tong
(Continued)

FOREIGN PATENT DOCUMENTS

JP 2004126968 A 4/2004

OTHER PUBLICATIONS

Rothstein, Marvin., "Airline Overbooking: The State of the Art", Journal of Transport Economics and Policy vol. 5, No. 1 (Jan. 1971), pp. 96-99.

(Continued)

*Primary Examiner* — Charles M Swift

(57) ABSTRACT

Various embodiments are generally directed to techniques for job flow processing, such as by ordering the performance of parallel tasks in a job flow to minimize a makespan for the job flow, for instance. Some embodiments are particularly directed to ordering the performance of tasks in a job flow based on computation of one or more independent and dependent metrics for tasks in a job flow. In many embodiments, tasks along a critical path of a job flow may be identified and prioritized using the one or more metrics computed for tasks in the job flow. For example, computing a time remaining until end and/or a longest path to end for each task in a job flow may enable a listing of tasks in the job flow to be ordered in a manner that prioritizes tasks to optimize the makespan for the job flow to be executed.

30 Claims, 33 Drawing Sheets

(56) References Cited

U.S. PATENT DOCUMENTS

| | | | |
|---|---|---|---|
| 4,947,397 A | | 8/1990 | Sobel et al. |
| 5,093,794 A | | 3/1992 | Howie et al. |
| 5,319,464 A | | 6/1994 | Douglas et al. |
| 5,325,495 A | * | 6/1994 | McLellan ............. G06F 9/3804 |
| | | | 712/219 |
| 5,361,362 A | | 11/1994 | Benkeser et al. |
| 5,363,175 A | | 11/1994 | Matysek |
| 5,442,730 A | | 8/1995 | Bigus |
| 5,709,410 A | | 1/1998 | Reeves, Jr. |
| 5,881,283 A | | 3/1999 | Hondou et al. |
| 5,909,587 A | * | 6/1999 | Tran ..................... G06F 9/3017 |
| | | | 712/1 |
| 5,978,830 A | | 11/1999 | Nakaya et al. |
| 6,038,539 A | | 3/2000 | Maruyama et al. |
| 6,070,144 A | | 5/2000 | Ginsberg et al. |
| 6,213,652 B1 | | 4/2001 | Suzuki et al. |
| 6,272,606 B1 | | 8/2001 | Dorricott et al. |
| 6,353,844 B1 | | 3/2002 | Bitar et al. |
| 6,665,740 B1 | | 12/2003 | Mason, Jr. et al. |
| 6,694,345 B1 | | 2/2004 | Brelsford et al. |
| 6,889,243 B1 | | 5/2005 | Hondou et al. |
| 7,024,671 B2 | | 4/2006 | Yamashita |
| 7,076,781 B2 | | 7/2006 | Skovira |
| 7,100,074 B2 | | 8/2006 | Watanabe et al. |
| 7,233,792 B2 | | 6/2007 | Chang |
| 7,502,747 B1 | | 3/2009 | Pardo et al. |
| 7,596,788 B1 | | 9/2009 | Shpigelman |
| 7,721,290 B2 | | 5/2010 | Horikawa |
| 7,861,246 B2 | | 12/2010 | Lu et al. |
| 8,479,204 B1 | * | 7/2013 | Labonte ............. G06F 11/3419 |
| | | | 718/100 |
| 8,600,787 B2 | | 12/2013 | Fox et al. |
| 8,645,173 B2 | | 2/2014 | Fox et al. |
| 2002/0016809 A1 | | 2/2002 | Foulger et al. |
| 2003/0236877 A1 | * | 12/2003 | Allan ..................... G06Q 30/06 |
| | | | 709/224 |
| 2004/0237087 A1 | | 11/2004 | Ye et al. |
| 2005/0065826 A1 | | 3/2005 | Baker et al. |
| 2005/0131865 A1 | | 6/2005 | Jones et al. |
| 2005/0235286 A1 | | 10/2005 | Ballew et al. |
| 2005/0262506 A1 | | 11/2005 | Dawson et al. |
| 2006/0149755 A1 | | 7/2006 | Marshall et al. |
| 2006/0288346 A1 | | 12/2006 | Santos et al. |
| 2007/0061180 A1 | | 3/2007 | Offenberg |
| 2007/0143499 A1 | | 6/2007 | Chang |
| 2008/0120620 A1 | | 5/2008 | Lett et al. |
| 2008/0184248 A1 | | 7/2008 | Barua et al. |
| 2011/0271283 A1 | | 11/2011 | Bell, Jr. et al. |
| 2012/0060165 A1 | * | 3/2012 | Clarke ................. G06F 9/5038 |
| | | | 718/104 |
| 2012/0226788 A1 | | 9/2012 | Jackson |
| 2013/0123128 A1 | | 5/2013 | Fox et al. |
| 2013/0132131 A1 | | 5/2013 | Fox et al. |
| 2013/0179894 A1 | | 7/2013 | Calder et al. |
| 2013/0191843 A1 | | 7/2013 | Sarkar et al. |
| 2013/0198759 A1 | * | 8/2013 | Shah ..................... G06F 9/4881 |
| | | | 718/105 |
| 2015/0312335 A1 | | 10/2015 | Ying et al. |
| 2015/0324728 A1 | * | 11/2015 | De ......................... G06Q 10/06 |
| | | | 705/7.15 |
| 2016/0026959 A1 | * | 1/2016 | Leber .................... G06Q 10/06 |
| | | | 705/7.26 |
| 2016/0350160 A1 | * | 12/2016 | Hamway ............ H04L 41/0806 |
| 2017/0075693 A1 | * | 3/2017 | Bishop ................... G06F 9/5088 |
| 2017/0083368 A1 | * | 3/2017 | Bishop .................... G06F 9/505 |
| 2018/0218295 A1 | * | 8/2018 | Hasija .................. G06Q 10/067 |

OTHER PUBLICATIONS

Kumar, Pardeep., "An efficient Genetic Algorithm Approach for Minimising the Makespan of Job Shop Scheduling Problems", ISSN: 2278-7798 International Journal of Science, Engineering and Technology Research (IJSETR) vol. 5, Issue 5, May 2016.

Author Unknown, "Azkaban 3.0 Documentation", GitHub, Dec. 19, 2017, http://azkaban.github.io/azkaban/docs/latest/ 106 Pages.

E. Frachtenberg, G. Feitelson, F. Petrini and J. Fernandez, "Adaptive parallel job scheduling with flexible coscheduling," in IEEE Transactions on Parallel and Distributed Systems, vol. 16, No. 11, pp. 1066-1077, Nov. 2005.

Mohr, James, "Job Scheduling a la Carte", Linux Magazine, Issue 97, Dec. 2008, http://www.linux-magazine.com/Issues/2008/97/Open-Source-Job-Scheduler 10 pages.

Author Unknown, "Job scheduler", Wikipedia, Dec. 19, 2017, https://en.wikipedia.org/wiki/Job_scheduler 4 pages.

Author Unknown, "Johnson's rule", Wikipedia, 2018 Mar. 2018, https://en.wikipedia.org/wiki/Johnson%27s_rule 3 pages.

Author Unknown, MapReduce Tutorial, Hadoop, Aug. 4, 2014, https://hadoop.apache.org/docs/r1.2.1/mapred_tutorial.html 34 pages.

Kichak et al., "Optimization of Job Scheduling with Limited Workers to Reduce Makespan using Time Remaining Until End of Schedule", retrieved Apr. 23, 2018.

Rothstein, Marvin, "OR and Airline Overbooking Problem", Institute for Operations Research and the Management Sciences (INFORMS), Operations Research, vol. 33, No. 2 Mar.-Apr. 1985) pp. 237-248. <http://www.jstor.org/stable/170741, accessed Jul. 31, 2017.

Feitelson et al., "Theory and Practice in Parallel Job Scheduling", IPPS '97 Processing Workshop, Geneva, Switzerland, Apr. 5, 1997, Proceedings.

Author Unknown., "A Guide to the Project Management Body of Knowledge", PEMBOK Guide—Fifth Edition, 2013 Project Management Institute, ISBN: 978-1-935589-67-9.

Author Unknown., "Proplanner process engineering and management suite", saker solutions, retrieved Nov. 5, 2018.

Author Unknown., "Scheduling (computing)", Wikipedia, retrieved Nov. 5, 2018.

Vegda et al., "Scheduling of Dependent Tasks Application using Random Search Technique", Apr. 15, 2013, arXiv:1304.3980 [cs.DC].

Levy et al., "The ABCs of the Critical Path Method", Harvard Business Review, Sep. 1963.

Author Unknown., "Windows Task Scheduler", Wikipedia, retrieved Nov. 5, 2018.

Brinkmann, Martin., "Z-Cron: task scheduling for Windows", ghacks.net, May 31, 2017.

Marchal et al., "Scheduling tree-shaped task graphs to minimize memory and makespan", Research Report, Oct. 2012, ISSN 02496399 http://arxiv.org/ps/1210.2580v1.

Nieberg, Tim., "Scheduling Parallel Machine Scheduling", Colombia University, Spring 2010.

\* cited by examiner

FIG. 15B

Task data 1514 — Job data 1506 — 1500B

| Tasks 1412 | Task durations 1516 | Task dependencies 1518 |
|---|---|---|
| A | 10 | (none) |
| B | 40 | A |
| C | 40 | A |
| D | 30 | A |
| E | 40 | B |
| F | 140 | C |
| G | 120 | D |
| H | 40 | E |
| I | 40 | F |
| J | 120 | G |
| K | 10 | H, I, and J |

TECHNIQUES FOR JOB FLOW PROCESSING

CROSS-REFERENCE TO RELATED APPLICATIONS

This application claims the benefit of priority under 35 U.S.C. § 119(e) to U.S. Provisional Application Ser. No. 62/643,386 filed Mar. 15, 2018, the entirety of which is incorporated herein by reference. This application claims the benefit of priority under 35 U.S.C. § 119(e) to U.S. Provisional Application Ser. No. 62/679,516 filed Jun. 1, 2018, the entirety of which is incorporated herein by reference.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

Various embodiments described herein may include an apparatus comprising a processor and a storage to store instructions that, when executed by the processor, cause the processor to perform operations comprising one or more of: identify a job flow comprising a set of tasks for performance, each task in the job flow associated with a duration, and each task in the job flow is connected to at least one upstream task or at least one downstream task, wherein an upstream task for a respective task requires completion before performance of the respective task and a downstream task requires completion after performance of the respective task; determine a list of upstream tasks in the job flow; identify a set of end chain tasks comprising one or more tasks in the job flow and excluded from the list of upstream tasks, the set of end chain tasks including a first end chain task and a second end chain task; generate a data structure to store a held time remaining until end (TRUE) value for each task in the job flow; compute a current TRUE value for each end chain task, wherein a respective current TRUE value for a respective end chain task in the set of end chain tasks comprises a duration associated with the respective end chain task; update the held TRUE value in the data structure with the current TRUE value for each end chain task when the current TRUE value exceeds the held TRUE value; identify a first set of upstream tasks comprising a first upstream task and a second upstream task, the first set of upstream tasks comprising one or more upstream tasks connected to the first end chain task in the set of end chain tasks; compute a current TRUE value for each task in the first set of upstream tasks, wherein a respective current TRUE value for a respective task in the first set of upstream tasks comprises a sum of a duration associated with the respective task and the held TRUE value for the first end chain task; update the held TRUE value in the data structure with the current TRUE value for each task in the first set of upstream tasks when the current TRUE value exceeds the held TRUE value; and generate a job queue based on the data structure to store the held TRUE value for each task in the job flow, the job queue comprising a list of tasks in the job flow ordered from a largest held TRUE value to a smallest held TRUE value.

In some embodiments, the processor is caused to perform operations comprising one or more of: identify a second set of upstream tasks including the second upstream task and a third upstream task, the second set of upstream tasks comprising one or more upstream tasks connected to the second end chain task in the set of end chain tasks; compute a current TRUE value for each task in the second set of upstream tasks, wherein a respective current TRUE value for a respective task in the second set of upstream tasks comprises a sum of a duration associated with the respective task and the TRUE value for the second end chain task; and update the held TRUE value in the data structure with the current TRUE value for each task in the second set of upstream tasks when the current TRUE value exceeds the held TRUE value.

In one or more embodiments, the processor is caused to perform operations comprising replace the held TRUE value in the data structure with the current TRUE value based on a comparison of the current value for the second upstream task and the held TRUE value for the second upstream task to update the held TRUE value in the data structure with the current TRUE value for each task in the second set of upstream tasks when the current TRUE value exceeds the held TRUE value.

In many embodiments, the processor is caused to perform operations comprising one or more of: select a next task for assignment from the job queue; identify an available task executor in a set of task executors; and assign the next task for assignment to the available task executor for performance.

In several embodiments, the job queue may include an indication of each upstream task of each task in the job flow. In several such embodiments, the processor is caused to perform operations comprising assign a highest task in the job queue with all upstream tasks completed to a task executor when the task executor become available.

In various embodiments, the processor is caused to perform operations comprising perform a trial run for each task in the set of tasks to determine the duration for each task in the set of tasks.

In some embodiments, the processor is caused to perform operations comprising compute a makespan for the job flow, the makespan comprising a duration to perform the job flow with a defined number of executors based on the job queue. In some such embodiments, the processor is caused to perform operations comprising recompute the makespan for the job flow based on a change in the defined number of executors.

In many embodiments, the processor is caused to perform operations comprising identify a critical path for the job flow that begins with the task with the largest held TRUE value.

Various embodiments described herein may include a computer-implemented method, comprising one or more of: identifying a job flow comprising a set of tasks for performance, each task in the job flow associated with a duration, and each task in the job flow is connected to at least one upstream task or at least one downstream task, wherein an upstream task for a respective task requires completion before performance of the respective task and a downstream task requires completion after performance of the respective task; determining a list of upstream tasks in the job flow; identifying a set of end chain tasks comprising one or more tasks in the job flow and excluded from the list of upstream tasks, the set of end chain tasks including a first end chain task and a second end chain task; generating a data structure to store a held time remaining until end (TRUE) value for each task in the job flow; computing a current TRUE value for each end chain task, wherein a respective current TRUE value for a respective end chain task in the set of end chain tasks comprises a duration associated with the respective end chain task; updating the held TRUE value in the data structure with the current TRUE value for each end chain task when the current TRUE value exceeds the held TRUE value; identifying a first set of upstream tasks comprising a first upstream task and a second upstream task, the first set of upstream tasks comprising one or more upstream tasks connected to the first end chain task in the set of end chain tasks; computing a current TRUE value for each task in the first set of upstream tasks, wherein a respective current TRUE value for a respective task in the first set of upstream tasks comprises a sum of a duration associated with the respective task and the held TRUE value for the first end chain task; updating the held TRUE value in the data structure with the current TRUE value for each task in the first set of upstream tasks when the current TRUE value exceeds the held TRUE value; and generating a job queue based on the data structure to store the held TRUE value for each task in the job flow, the job queue comprising a list of tasks in the job flow ordered from a largest held TRUE value to a smallest held TRUE value.

In several embodiments, the computer-implemented method comprises one or more of: identifying a second set of upstream tasks including the second upstream task and a third upstream task, the second set of upstream tasks comprising one or more upstream tasks connected to the second end chain task in the set of end chain tasks; computing a current TRUE value for each task in the second set of upstream tasks, wherein a respective current TRUE value for a respective task in the second set of upstream tasks comprises a sum of a duration associated with the respective task and the TRUE value for the second end chain task; and updating the held TRUE value in the data structure with the current TRUE value for each task in the second set of upstream tasks when the current TRUE value exceeds the held TRUE value. In several such embodiments, the computer-implemented method comprises replacing the held TRUE value in the data structure with the current TRUE value based on a comparison of the current value for the second upstream task and the held TRUE value for the second upstream task to update the held TRUE value in the data structure with the current TRUE value for each task in the second set of upstream tasks when the current TRUE value exceeds the held TRUE value.

In many embodiments, the computer-implemented method comprises one or more of: selecting a next task for assignment from the job queue; identifying an available task executor in a set of task executors; and assigning the next task for assignment to the available task executor for performance.

In some embodiments, the job queue includes an indication of each upstream task of each task in the job flow. In some such embodiments, the computer-implemented method comprises assigning a highest task in the job queue with all upstream tasks completed to a task executor when the task executor become available.

In various embodiments, the computer-implemented method comprises performing a trial run for each task in the set of tasks to determine the duration for each task in the set of tasks.

In several embodiments, the computer-implemented method comprises computing a makespan for the job flow, the makespan comprising a duration to perform the job flow with a defined number of executors based on the job queue. In several such embodiments, the computer-implemented method comprises recomputing the makespan for the job flow based on a change in the defined number of executors.

In many embodiments, the computer-implemented method comprises identifying a critical path for the job flow that begins with the task with the largest held TRUE value.

Some embodiments described herein may include a computer-program product tangibly embodied in a non-transitory machine-readable storage medium, the computer-program product including instructions operable to cause a processor to perform operations comprising one or more of: identify a job flow comprising a set of tasks for performance, each task in the job flow associated with a duration, and each task in the job flow is connected to at least one upstream task or at least one downstream task, wherein an upstream task for a respective task requires completion before performance of the respective task and a downstream task requires completion after performance of the respective task; determine a list of upstream tasks in the job flow; identify a set of end chain tasks comprising one or more tasks in the job flow and excluded from the list of upstream tasks, the set of end chain tasks including a first end chain task and a second end chain task; generate a data structure to store a held time remaining until end (TRUE) value for each task in the job flow; compute a current TRUE value for each end chain task, wherein a respective current TRUE value for a respective end chain task in the set of end chain tasks comprises a duration associated with the respective end chain task; update the held TRUE value in the data structure with the current TRUE value for each end chain task when the current TRUE value exceeds the held TRUE value; identify a first set of upstream tasks comprising a first upstream task and a second upstream task, the first set of upstream tasks comprising one or more upstream tasks connected to the first end chain task in the set of end chain tasks; compute a current TRUE value for each task in the first set of upstream tasks, wherein a respective current TRUE value for a respective task in the first set of upstream tasks comprises a sum of a duration associated with the respective task and the held TRUE value for the first end chain task; update the held TRUE value in the data structure with the current TRUE value for each task in the first set of upstream tasks when the current TRUE value exceeds the held TRUE value; and generate a job queue based on the data structure to store the held TRUE value for each task in the job flow, the job queue comprising a list of tasks in the job flow ordered from a largest held TRUE value to a smallest held TRUE value.

In many embodiments, the computer-program product includes instructions operable to cause a processor to perform operations comprising one or more of: identify a second set of upstream tasks including the second upstream task and a third upstream task, the second set of upstream tasks comprising one or more upstream tasks connected to the second end chain task in the set of end chain tasks; compute a current TRUE value for each task in the second set of upstream tasks, wherein a respective current TRUE value for a respective task in the second set of upstream tasks comprises a sum of a duration associated with the respective task and the TRUE value for the second end chain task; and update the held TRUE value in the data structure with the current TRUE value for each task in the second set of upstream tasks when the current TRUE value exceeds the held TRUE value. In many such embodiments, the computer-program product includes instructions operable to cause a processor to perform operations comprising replace the held TRUE value in the data structure with the current TRUE value based on a comparison of the current value for the second upstream task and the held TRUE value for the second upstream task to update the held TRUE value in the data structure with the current TRUE value for each task in the second set of upstream tasks when the current TRUE value exceeds the held TRUE value.

In various embodiments, the computer-program product includes instructions operable to cause a processor to perform operations comprising one or more of: select a next task for assignment from the job queue; identify an available task executor in a set of task executors; and assign the next task for assignment to the available task executor for performance.

In several embodiments, the job queue includes an indication of each upstream task of each task in the job flow. In several such embodiments, the computer-program product includes instructions operable to cause a processor to perform operations comprising assign a highest task in the job queue with all upstream tasks completed to a task executor when the task executor become available.

In one or more embodiments, the computer-program product includes instructions operable to cause a processor to perform operations comprising perform a trial run for each task in the set of tasks to determine the duration for each task in the set of tasks.

In many embodiments, the computer-program product includes instructions operable to cause a processor to perform operations comprising compute a makespan for the job flow, the makespan comprising a duration to perform the job flow with a defined number of executors based on the job queue. In many such embodiments, the computer-program product includes instructions operable to cause a processor to perform operations comprising recompute the makespan for the job flow based on a change in the defined number of executors.

In some embodiments, the computer-program product includes instructions operable to cause a processor to perform operations comprising identify a critical path for the job flow that begins with the task with the largest held TRUE value.

In one or more embodiments described herein, analysis of a job flow to produce a job queue may include performance of one or more of the following operations, such as by an apparatus comprising a processor and a storage to store instructions that, when executed by the processor, cause the processor to perform one or more of the following operations. Operations may involve the following. Identify a job flow with an upstream direction and a downstream direction, the job flow comprising a set of tasks associated with performance of a job, the set of tasks to include first, second, third, and fourth tasks, wherein the first task is connected in parallel to the second and third tasks in the downstream direction and the fourth task is connected in parallel to the second and third tasks in the upstream direction. Identify job data comprising task data for each task in the job flow, the task data for each task in the job flow to include a set of task dependencies and a task duration, wherein the set of task dependencies for the first task includes an empty set, the set of task dependencies for the second and third task include the first task and the set of task dependencies for the fourth task includes the second and third tasks. Determine a list of dependency tasks based on the set of task dependencies for each task in the job flow, wherein the list of dependency tasks include the first, second, and third tasks. Identify a set of end chain tasks comprising one or more tasks in the job flow and excluded from the list of dependency tasks, wherein the set of end chain tasks include the fourth task. Compute a set of paths to end for each task in the job flow, the set of paths to end for a respective task comprising each possible route from the respective task to a respective end chain task in the set of end chain tasks, wherein the set of paths to end for the first task includes a first path comprising the first, second, and fourth tasks and a second path comprising the first, third, and fourth tasks, the set of paths to end for the second task includes a third path comprising the second, and fourth tasks, the set of paths to end for the third task includes a fourth path comprising the third and fourth tasks, and the set of paths to end for the fourth task includes a fifth path comprising the fourth task. Calculate a total duration for each path in each set of paths to end for each task in the job flow, the total duration for each respective path in a respective set of paths comprising a summation of task durations along the respective path, wherein the total duration for the first path comprises the summation of task durations for the first, second, and fourth tasks and the total duration for the second path comprises the summation of task durations for the first, third, and fourth tasks, the total duration for the third path comprises the summation of task durations for the second and fourth tasks, the total duration for the fourth path comprises the summation of task durations for the third and fourth tasks, and the total duration for the fifth path comprises the task duration for the fourth task. Determine a time remaining until end (TRUE) value for each task in the job flow, the TRUE value for the respective task comprising a value of a maximum total duration between paths in the respective set of paths to end, wherein the TRUE value for the first task comprises the value of a maximum between the total duration for the first path and the total duration for the second path, the TRUE value for the second task comprises the total duration of the third path, the TRUE value for the third task comprises the total duration of the fourth path, and the TRUE value for the fourth task comprises the total duration of the fifth path. Generate a job queue based on the TRUE value for each task in the job flow, the job queue comprising a list of tasks in the job flow ordered from a largest TRUE value to a smallest TRUE value, wherein the first task is higher than the second, third, and fourth tasks in the job queue and the fourth task is lower than the first, second, and third tasks in the job queue.

In some embodiments, operations comprising determine the TRUE value for the second and third tasks based on the TRUE value for the fourth task may be performed. In various embodiments, operations comprising determine the TRUE value for the first task based on a maximum TRUE value between the TRUE value for the second task and the TRUE value for the third task may be performed. In many embodiments, operations comprising determine a longest path to end (LPE) for each task in the job flow, the LPE for the respective task comprising a path with the maximum total duration for the respective set of paths to end, wherein the LPE for the first task comprises the path with the maximum total duration between the first path and the second path, the LPE for the second task comprises the third path, the LPE for the for the third task comprises the fourth path, and the LPE for the fourth task comprises the fifth path may be performed. In many such embodiments, operations comprising identify the LPE for the first task as a critical path for the job flow may be performed.

In one or more embodiments, operations comprising assign a top task from the job queue to a first executor for performance; determine an updated TRUE value for each remaining task in the job flow upon completion of the top task by the first executor; generate an updated job queue based on the updated TRUE value for each task in the job flow; and assign an updated top task from the updated job queue to a second executor for performance may be performed. In various embodiments operations comprising:

determine all task dependencies for a highest unassigned task in the task queue have not been met; determine all task dependencies for a next highest unassigned task in the task queue have been met in response to determination all task dependencies for the highest unassigned task in the task queue have not been met; and assign the next highest unassigned task in the task queue to an executor for performance may be performed.

In some embodiments, the first and second paths are comprised in Euler paths of the job flow. In various embodiments, operations comprising determine the task duration for the first task based on a duration of a previous performance of the first task may be performed. In several embodiments operations comprising determine a makespan for the job, the makespan comprising a duration to perform the job with a defined number of executors based on the job queue may be performed.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 15A and 15B illustrate various aspects of exemplary job data, according to some embodiments of the present technology.

DETAILED DESCRIPTION

Figure 1:
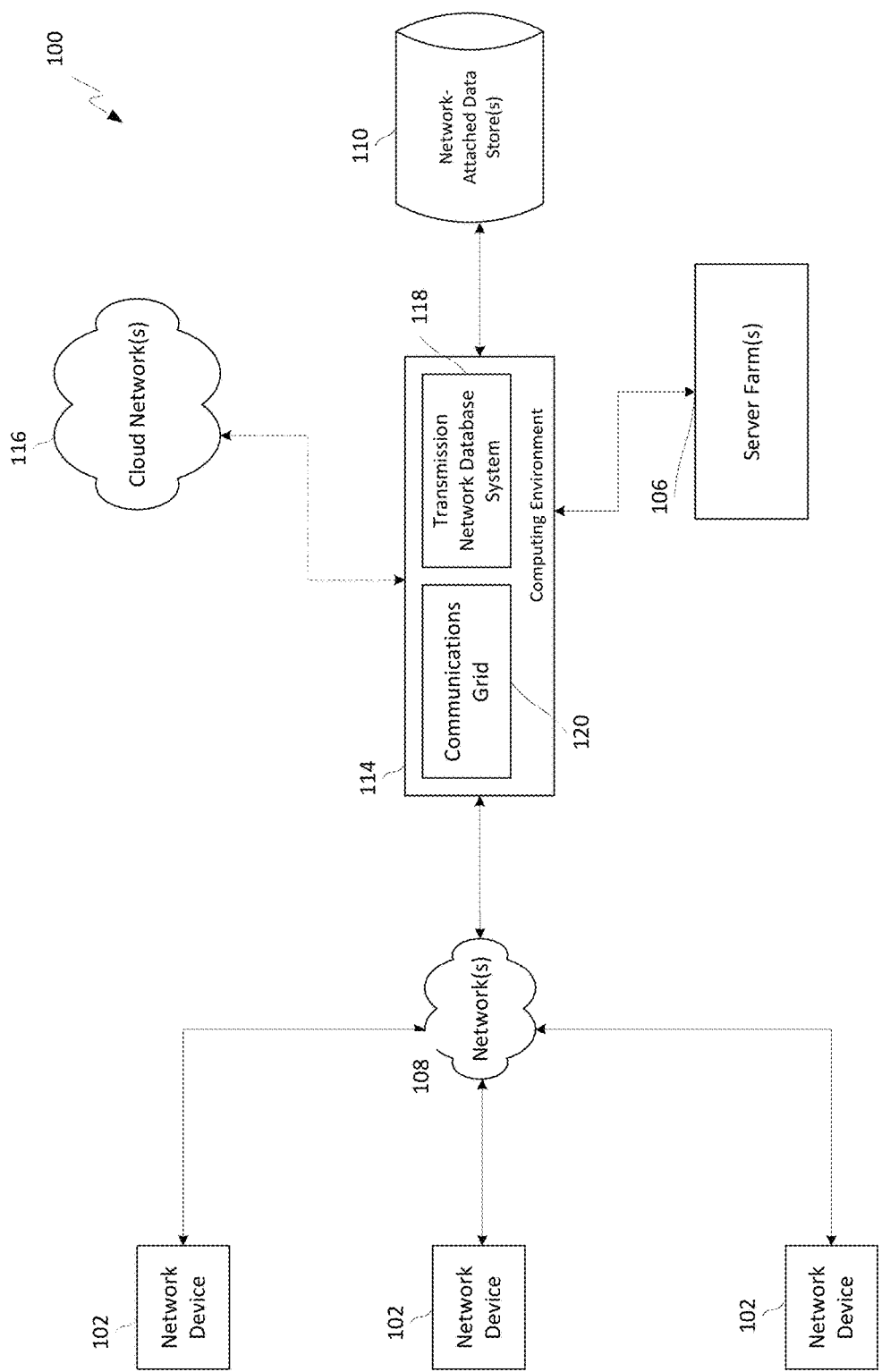
FIG. 1 illustrates a block diagram that provides an illustration of the hardware components of a computing system, according to some embodiments of the present technology.

Various embodiments are generally directed to techniques for job flow processing, such as by ordering the performance of tasks in a job flow to minimize a makespan for the job flow, for instance. In one or more embodiments, the makespan for a job flow may refer to the amount of time to perform all the tasks in the job flow. Some embodiments are particularly directed to ordering the performance of tasks in a job flow based on computation of one or more metrics for tasks in a job flow. In many embodiments, tasks along a critical path of a job flow may be identified and prioritized using the one or more metrics computed for tasks in the job flow. For example, computing a time remaining until end and/or a longest path to end for each task in a job flow may enable a listing of tasks in the job flow to be ordered in a manner that prioritizes tasks to optimize the makespan for the job flow. These and other embodiments are described and claimed.

Some challenges facing job flow processing include inefficient ordering and/or performance of tasks in a job flow. For instance, tasks may be performed in a manner that results in suboptimal utilization of task executors and excessive makespans, such as by ordering tasks for performance according to a first-in-first-out (FIFO) scheme. These challenges may result from an inability to identify and order tasks in a job flow to minimize the makespan for performance of the job flow. For example, task dependencies as well as opportunities to perform tasks in parallel may not be considered in ordering tasks in a job flow. This can result in excessive idle time for task executors, such as while waiting for completion of another task. Often, job flow processing fails to identify and prioritize tasks along a critical path of the job flow, especially when there may be multiple, alternative complex paths in a job flow. These and other factors may result in job flow processing systems with limited capabilities and poor efficiency. Such limitations can drastically diminish the desirability and applicability of job flow processing systems, contributing to increased idle time, wasted capacity and reduced throughput.

Various embodiments described herein include a job flow processing system that prioritizes tasks in a job flow in a manner that minimizes the makespan of a job flow. In many embodiments, the job flow processing system may identify one or more critical paths in a job flow and prioritize tasks along the critical path to minimize the makespan of the job flow. In several embodiments, a list of tasks in a job flow may be optimally ordered, such that after all dependencies are taken into consideration, at any given time (and when possible) one or more task executors (out of all task executors) are working on a task that is on a critical path through the job flow. In many embodiments, when a task on the critical path completes, another task from the critical path is assigned to the newly idle task executor (when more optimal and possible). In some embodiments, one or more metrics may be computed that facilitates sorting a list of tasks in a job flow in such a way that a task assignor sees/assigns critical jobs first. In various embodiments, the one or more metrics may be calculated in non-deterministic polynomial time. In some embodiments, the ordering and/or one or more metrics can be computed up front or each time a task completes to be reactive to changes. In many embodiments, use of the one or more metrics is dynamic because they do not depend on characteristics of the task executors performing the tasks. For instance, tasks are not mapped to specific task executors. In another instance, a failed task executor can be readily replaced and/or removed.

In many embodiments, the one or more metrics may include a time remaining until end (TRUE) value and a longest path to end (LPE) for each task in a job flow. In some embodiments, an LPE for a respective task may include the list of tasks (based on dependencies in the job flow) needed to get from the respective task to the end of the job flow. In some such embodiments, a TRUE value for the respective task may include a summation of durations for each of the tasks along the LPE for the respective task. In various embodiments, the TRUE value for a respective task may include the longest path duration among all possible paths from the respective task to the end of a job flow. In one or more embodiments described herein, tasks in a job flow may be ordered from the task with the largest TRUE value to the task with the smallest TRUE value to minimize the makespan for the job flow. In one or more such embodiments, the LPE of the task with the largest TRUE value may be a critical path of the job flow. In many embodiments, tasks in the job flow may be assigned to task executors for performance based on the unassigned task with the highest TRUE value that has no unsatisfied dependencies.

In these and other ways one or more components of the job flow processing system can improve efficiency of performing a job flow, such as by improving task executor utilization, reducing makespans, and increasing robustness, resulting in several technical effects, advantages, and advances over conventional computer technology. In various embodiments, one or more components of the job flow processing system may be implemented in a practical application via one or more computing devices, and thereby provide additional and useful functionality to the one or more computing devices, resulting in more capable, better functioning, and improved computing devices. In some embodiments, the one or more components of the job flow processing system may be implemented as a set of rules that improve computer-related technology by allowing a function not previously performable by a computer that enables an improved technological result to be achieved. In some such embodiments, the function may include ordering tasks in a job flow to minimize a makespan for performing the job flow as an improved technological result. In various embodiments, one or more components of the job flow processing system may enable a job flow to be performed more efficiently, such as with computing devices, by enabling tasks in the job flow to be ordered and/or performed in a manner that reduces performance time of the overall job flow, increases utilization of task executors performing the tasks, and improves reliability.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
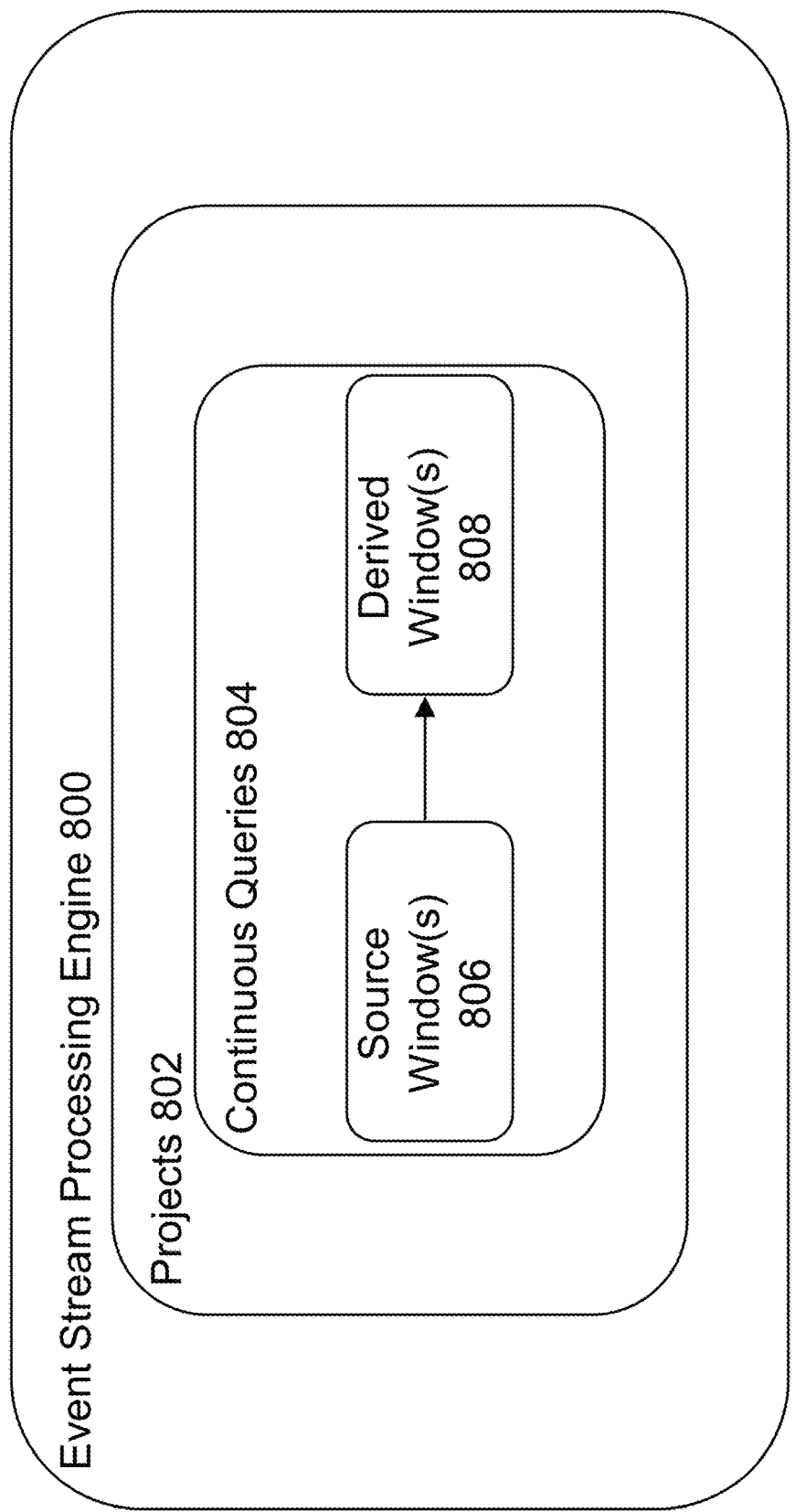
FIG. 8 illustrates a block diagram including components of an Event Stream Processing Engine (ESPE), according to embodiments of the present technology.
Figure 9:
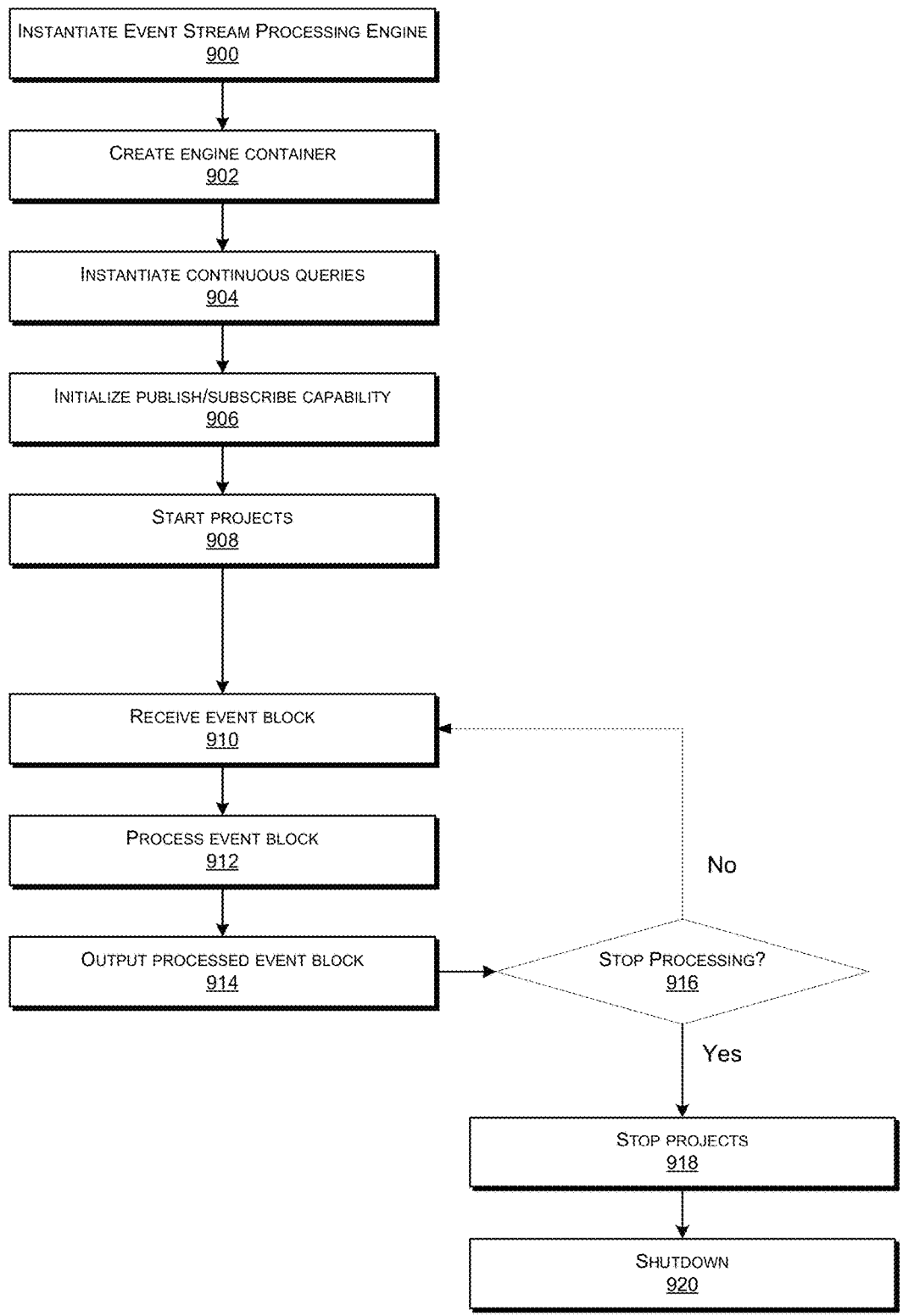
FIG. 9 illustrates a flow chart showing an example process including operations performed by an event stream processing engine, according to some embodiments of the present technology.
Figure 10:
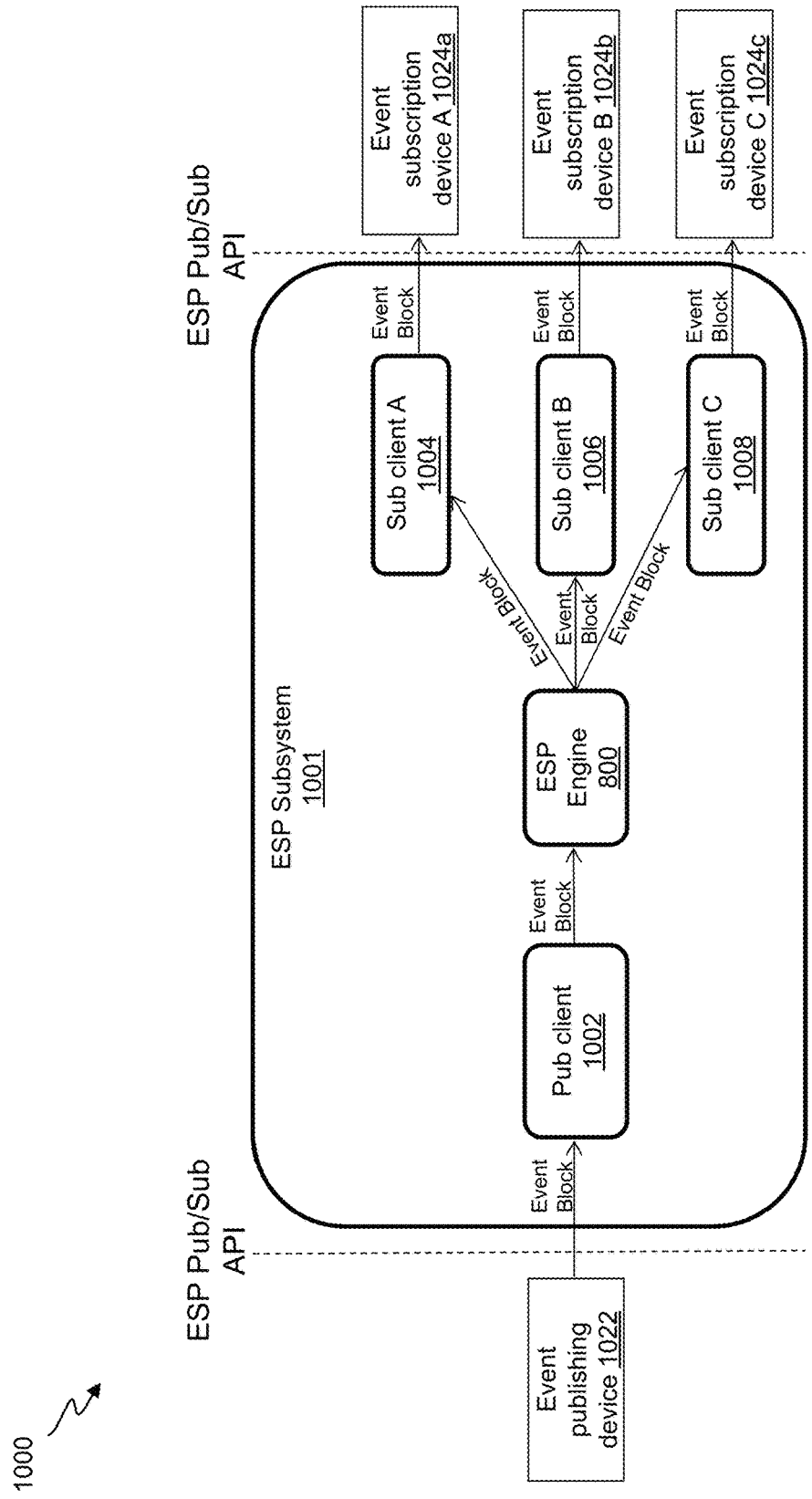
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
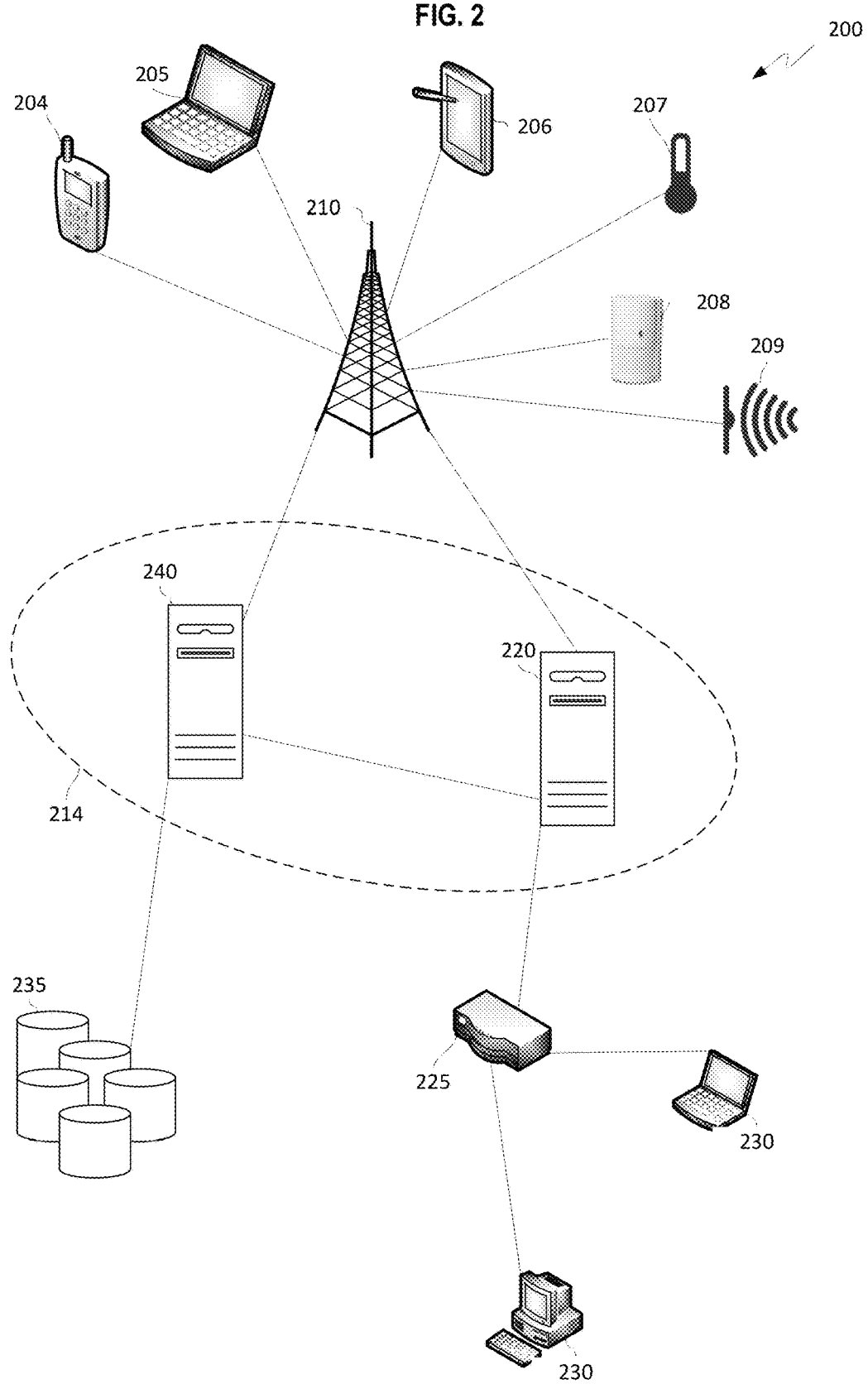
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect, and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values computed from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
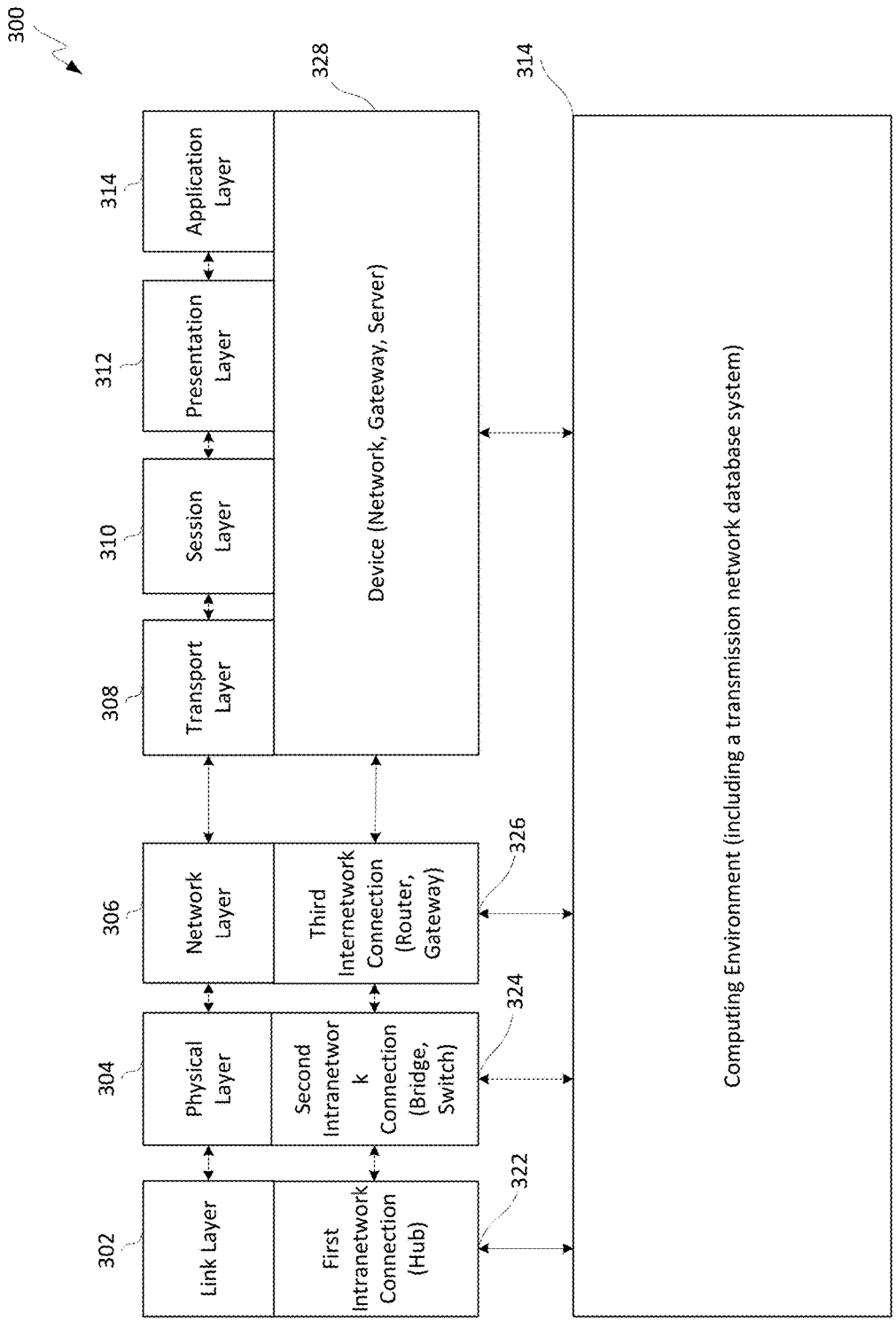
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types and/or encodings known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
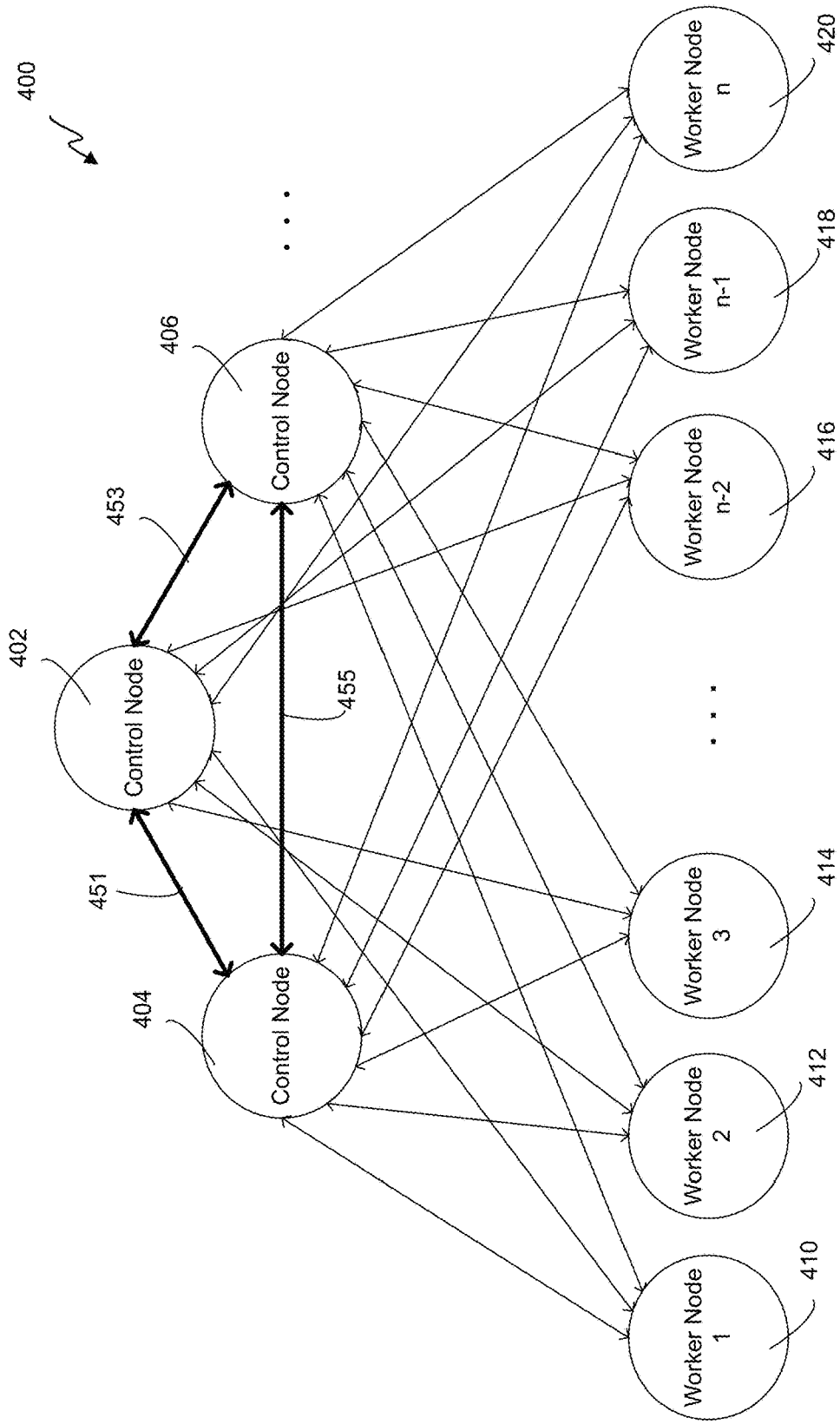
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology.

Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a Hadoop data node employing Hadoop Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node, other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
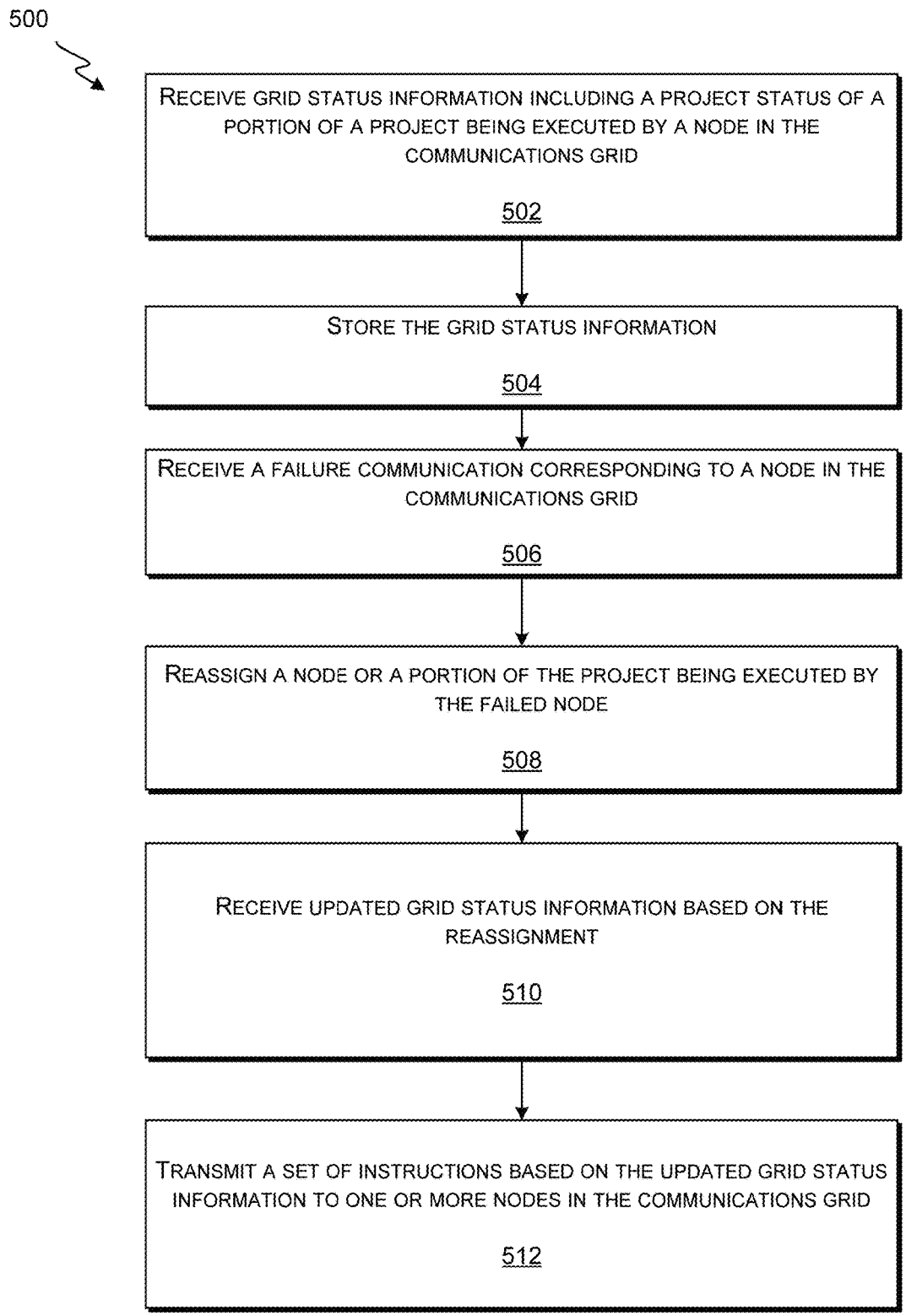
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
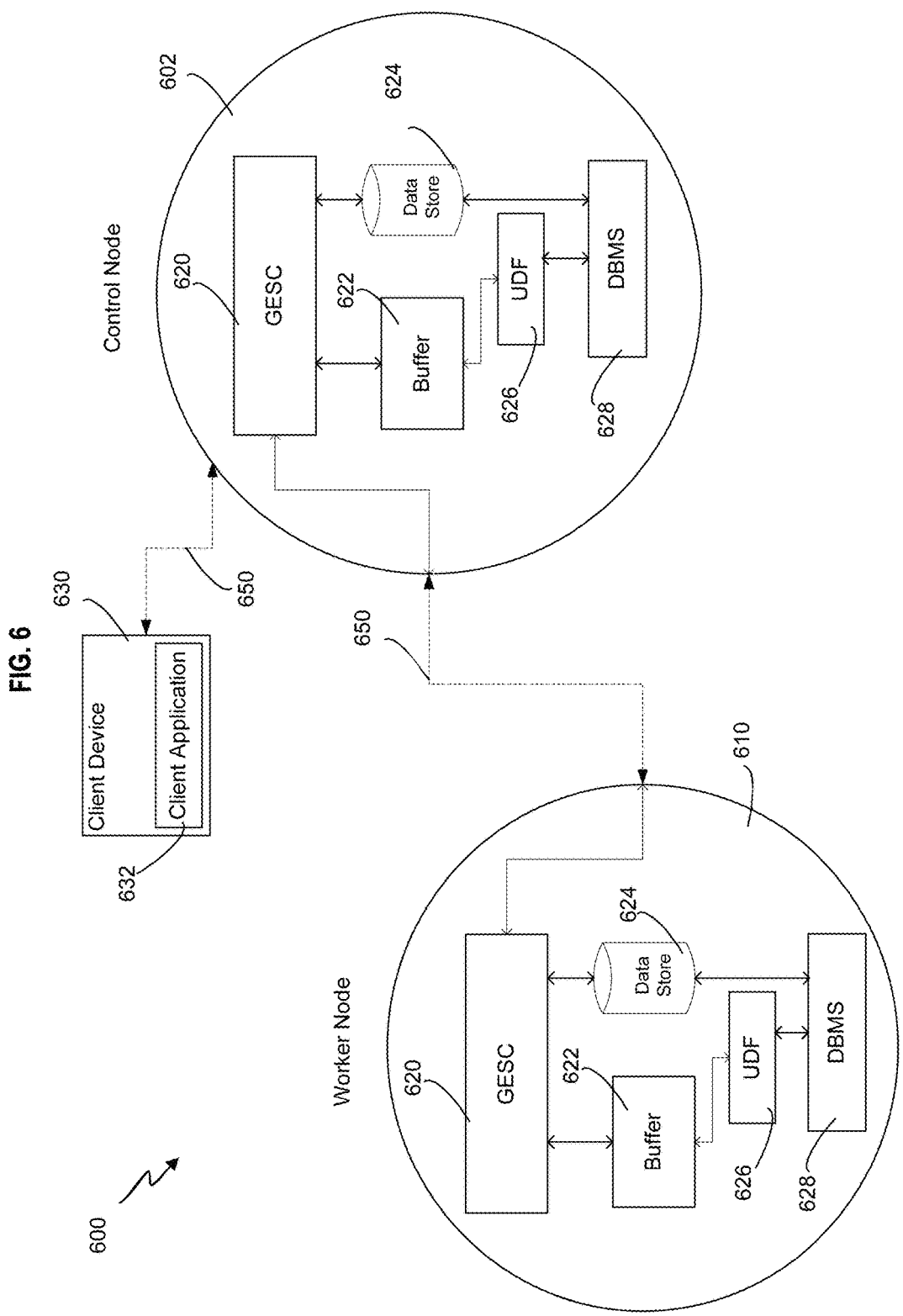
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a node 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
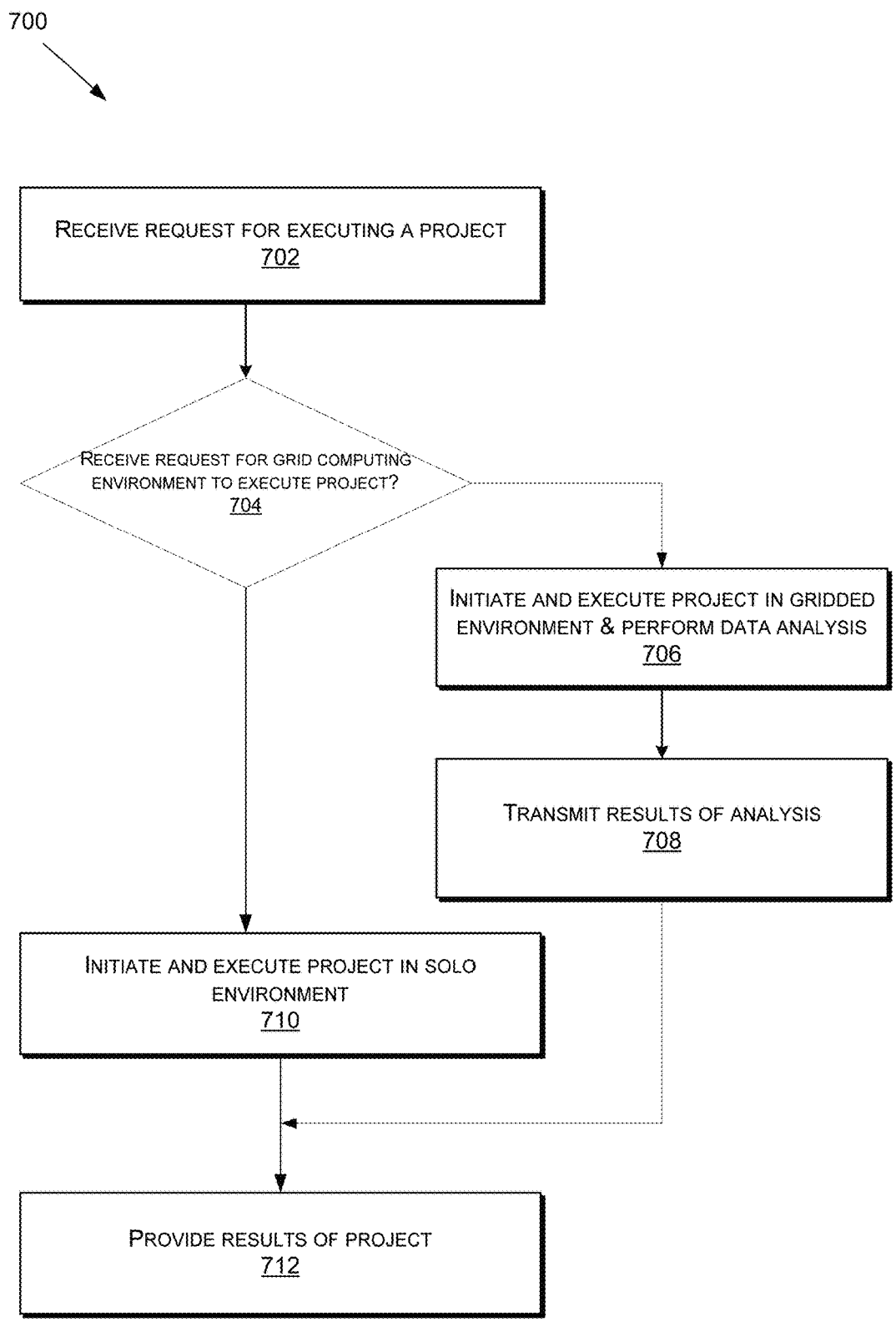
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop-down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874*a*-*c*, according to embodiments of the present technology. ESP system 850 may include ESP device or subsystem 851, event publishing device 872, an event subscribing device A 874*a*, an event subscribing device B 874*b*, and an event subscribing device C 874*c*. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874*a*, event subscribing device B 874*b*, and event subscribing device C 874c. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874a, event subscribing device B 874b, and event subscribing device C 874c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874a, event subscribing device B 874b, and event subscribing device C 874c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874a using the publish/subscribe API. Subscribing client B 856 may be started by an event subscription application B executing at event subscribing device B 874b using the publish/subscribe API. Subscribing client C 858 may be started by an event subscription application C executing at event subscribing device C 874c using the publish/subscribe API.

An event block object containing one or more event objects is injected into a source window of the one or more source windows 806 from an instance of an event publishing application on event publishing device 872. The event block object may be generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874a, event subscription device B 874b, and event subscription device C 874c. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874a-c. For example, subscribing client A 804, subscribing client B 806, and subscribing client C 808 may send the received event block object to event subscription device A 874a, event subscription device B 874b, and event subscription device C 874c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
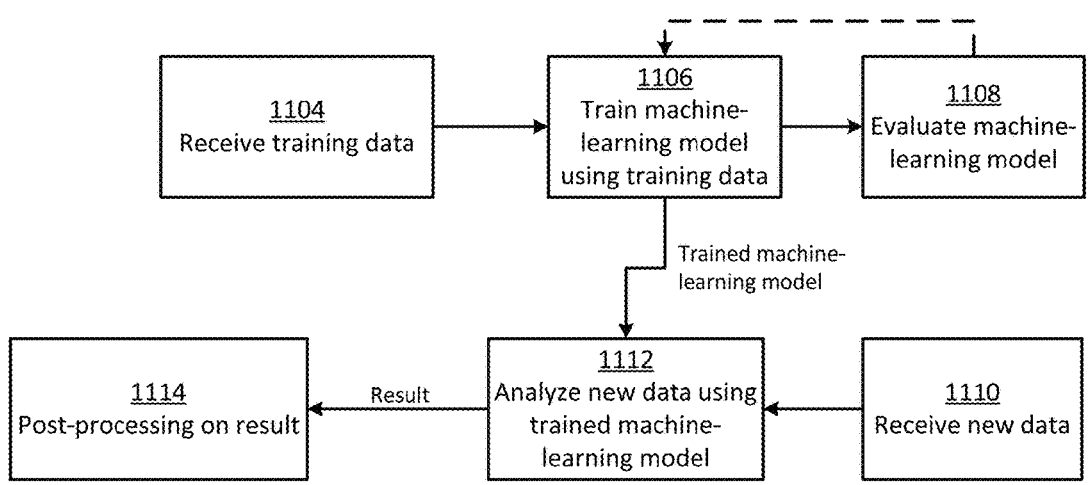
FIG. 11 illustrates a flow chart showing an example process for generating and using a machine-learning model, according to some embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
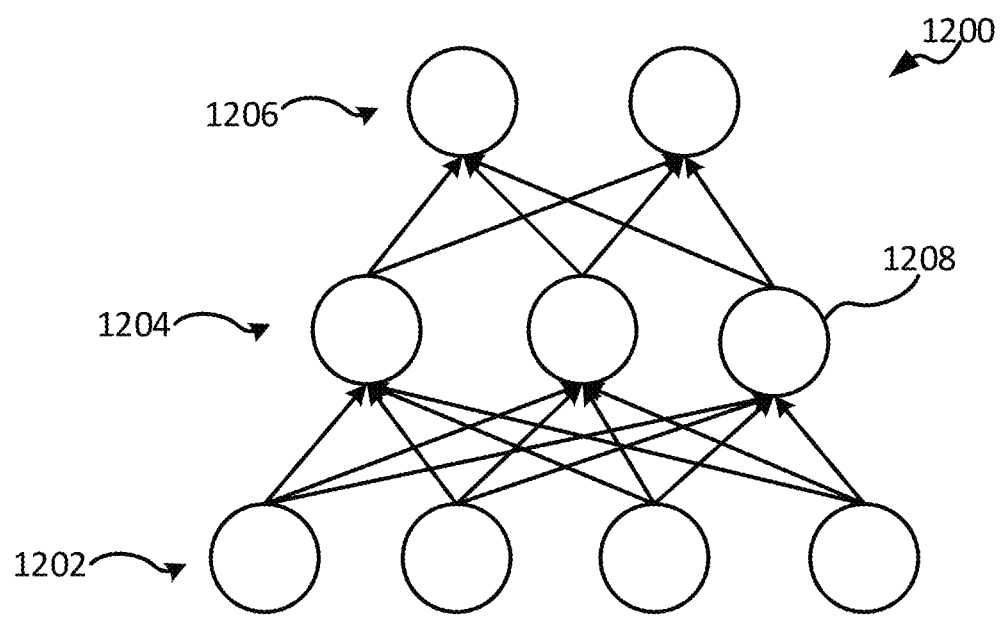
FIG. 12 illustrates a neural network including multiple layers of interconnected neurons, according to some embodiments of the present technology.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

According to embodiments discussed herein, the above-described computing devices and systems may be utilized to implement one or more features or components of a job flow processing system. One or more aspects of the job flow processing system described herein may be used to optimize an ordering of tasks in a job flow, reduce the makespan of a job flow, increase utilization of task executors performing tasks in a job flow, and/or enable reliable and robust performance of a job flow, resulting in a computing device and/or system with exclusive and advantageous capabilities. For example, tasks along one or more critical paths of a job flow may be prioritized to improve various aspects associated with performance of the job flow.

In these and other ways one or more components of the job flow processing system can improve efficiency of performing a job flow, such as by improving task executor utilization, reducing makespans, and increasing robustness, resulting in several technical effects, advantages, and advances over conventional computer technology. In many embodiments, one or more components of the job flow processing system may be implemented in a practical application via one or more computing devices, and thereby provide additional and useful functionality to the one or more computing devices, resulting in more capable, better functioning, and improved computing devices. In various embodiments, the one or more components of the job flow processing system may be implemented as a set of rules that improve computer-related technology by allowing a function not previously performable by a computer that enables an improved technological result to be achieved. In various such embodiments, the function may include ordering tasks in a job flow to minimize a makespan for performing the job flow as an improved technological result. In several embodiments, one or more components of the job flow processing system may enable a job flow to be performed more efficiently, such as with computing devices, by enabling tasks in the job flow to be ordered and/or performed in a manner that reduces performance time of the overall job flow, increases utilization of task executors performing the tasks, removes dependencies on specific task executors, and improves reliability.

Figure 13:
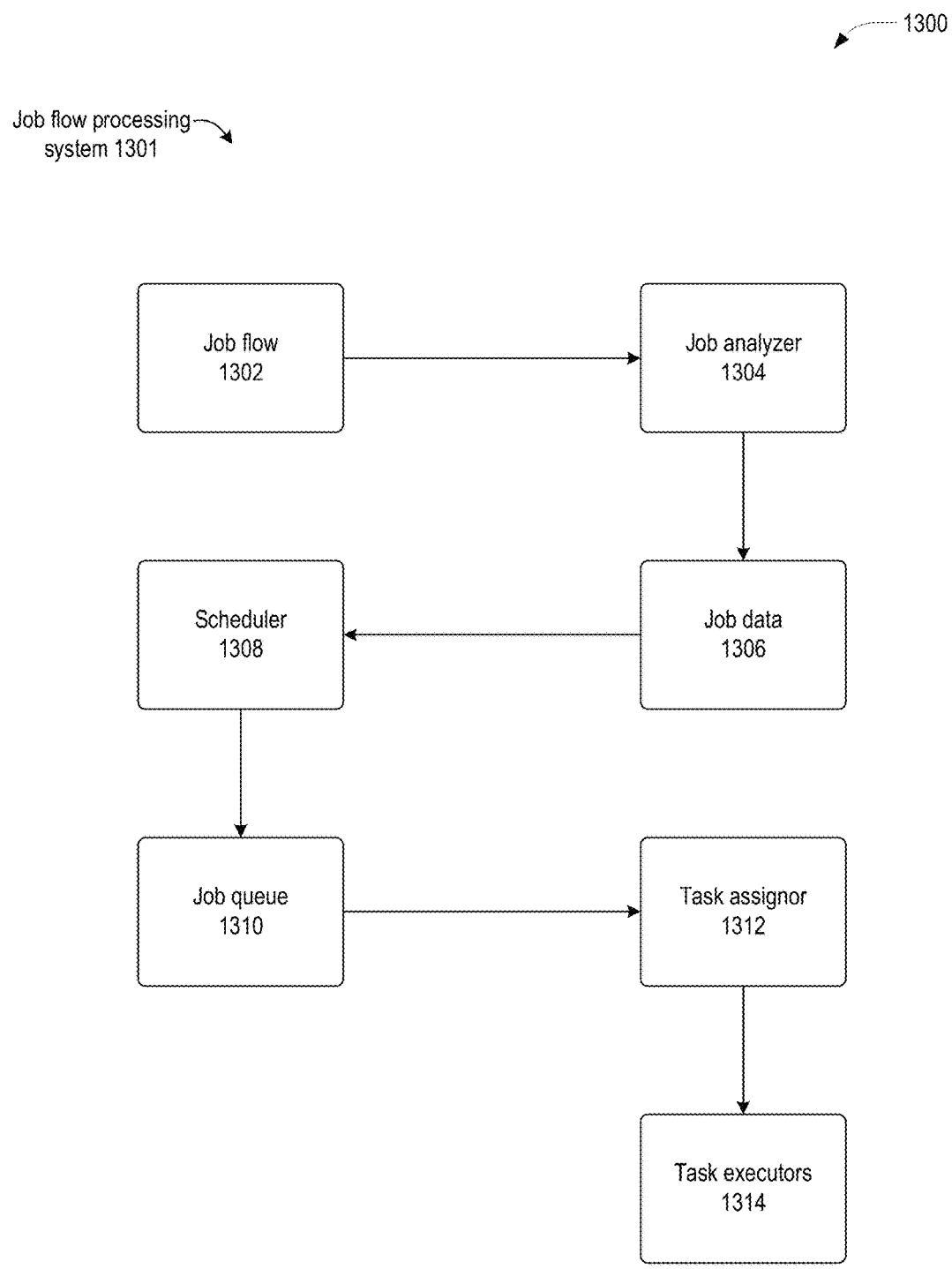
FIG. 13 illustrates an exemplary job flow processing system, according to some embodiments of the present technology.

FIG. 13 illustrates an exemplary job flow processing system 1301 in environment 1300 that may be representative of various embodiments. In environment 1300, job flow processing system 1301 may include job flow 1302, job analyzer 1304, job data 1306, scheduler 1308, job queue 1310, task assignor 1312, and one or more task executors 1314. In one or more embodiments described herein, job analyzer 1304 may receive job flow 1302 as input and produce job data 1306 as output; scheduler 1308 may receive job data 1306 as input and produce job queue 1310 as output; and task assignor 1312 may utilize job queue 1310 to assign tasks in job flow 1302 to the one or more task executors 1314. In various embodiments, the job flow 1302 may include one or more tasks that are prioritized to produce job queue 1310. In various such embodiments, performance of tasks according to job queue 1310 can optimize execution of the job flow 1302. Embodiments are not limited in this context.

In various embodiments, job flow processing system 1301 may operate on or be associated with the job shop problem. The job shop problem typically involves a set of tasks with interdependencies (or a set order) and a limit to the number of task executors 1314 (e.g., workers/machines/threads) that may each work on a single task in the set of tasks at a time. The set of tasks and the associated dependencies can be referred to as the job flow 1302. In some embodiments, the task executors 1314 may work in parallel to the extent that dependencies in the job flow allow them to (it is possible that less than the total number of task executors may be busy at once). In many embodiments described herein, each task executor may include one or more of the following characteristics including the capability to perform any task in the job flow, the ability to perform any task in the same duration as any other task executor, and the ability to change to a different task with no downtime.

Figure 18A:
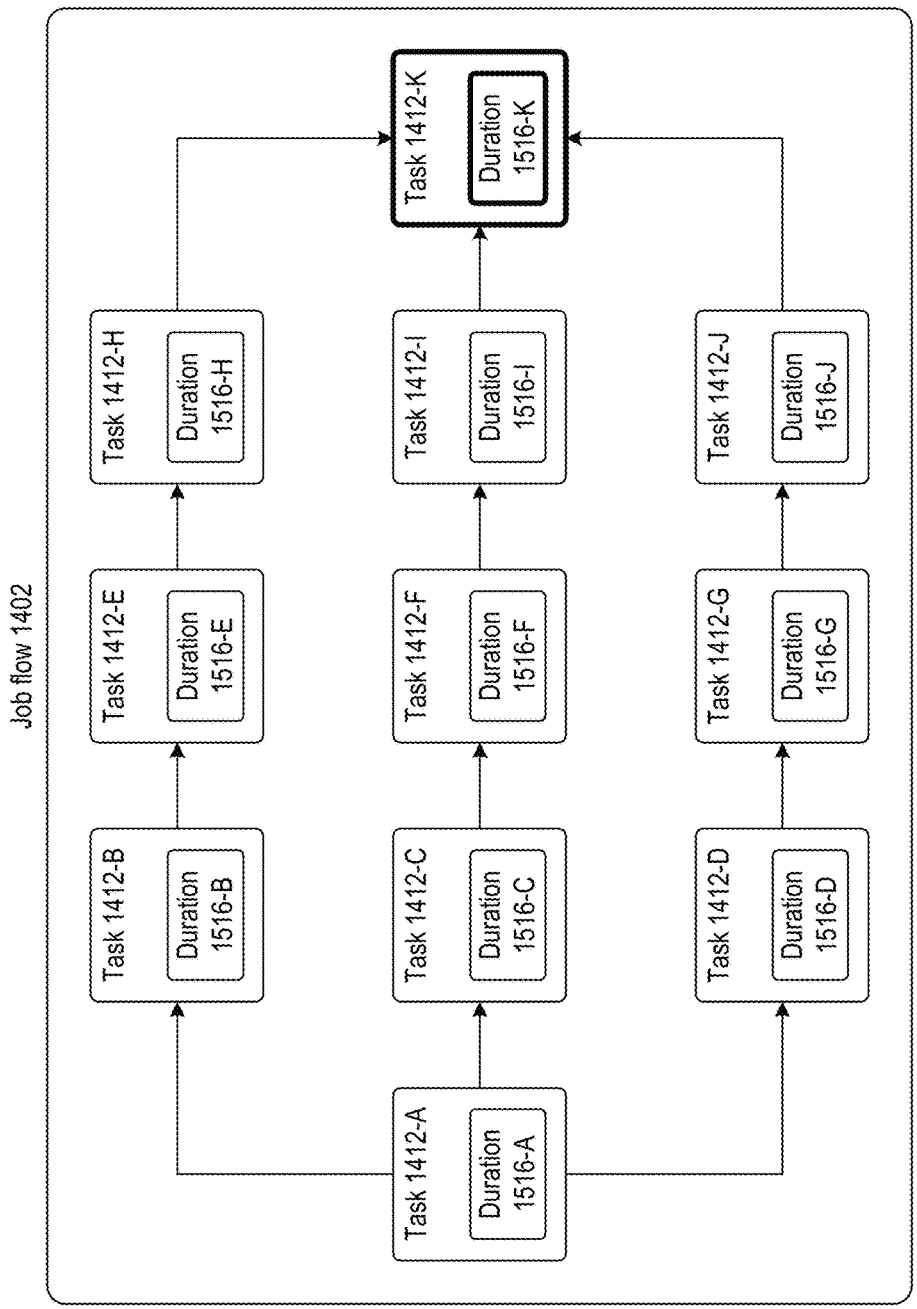
FIGS. 18A-18C illustrate various aspects of computing metrics in job flow processing, according to some embodiments of the present technology.

In many embodiments, task durations may be provided in the job flow 1302 (see e.g., FIG. 18A). In other embodiments, the job analyzer 1304 may determine durations for each task in the job flow 1302. For example, job analyzer 1304 may perform trial runs on a task to determine its duration. In various embodiments, the job analyzer 1304 may format the job flow 1302 into job data 1306 that includes each task, any dependencies for each task, and a duration for each task. In other embodiments, the job flow 1302 may already be in an appropriate format to provide directly to the scheduler 1308. In one or more embodiments, task assignor 1312 may assign tasks in the job flow 1302 to various task executors 1314 for performance. In one or more such embodiments, the task assignor may assign tasks to task executors 1314 for performance according to the job queue 1310. In some embodiments, job queue may be referred to as a schedule. In several embodiments, the job queue 1310 may include an ordered list of the tasks in the job flow that is generated by the scheduler 1308 and optimized to minimize the makespan for the job flow 1302. In some embodiments, the makespan may refer to the total duration to perform every task in the job flow 1302.

It will be appreciated that job flow processing system 1301 is illustrated to give an overview of different aspects of processing job flows. However, various embodiments described herein may include more, less, and/or different components than those illustrated in environment 1300 without departing from the scope of this disclosure. For example, some embodiments may include scheduler 1308 while excluding one or more other components of the job flow processing system 1301. In such embodiments, scheduler 1308 may receive input regarding a job flow, calculate one or more parameters corresponding to the job flow, and output an optimized list of tasks in the job flow based on the one or more parameters. In another example, job analyzer 1304 may not be needed to identify/produce job data 1306. Instead, job data 1306 may be included in job flow 1302. The illustrated components of job flow processing system 1301 will be described in more detail below.

Figure 14:
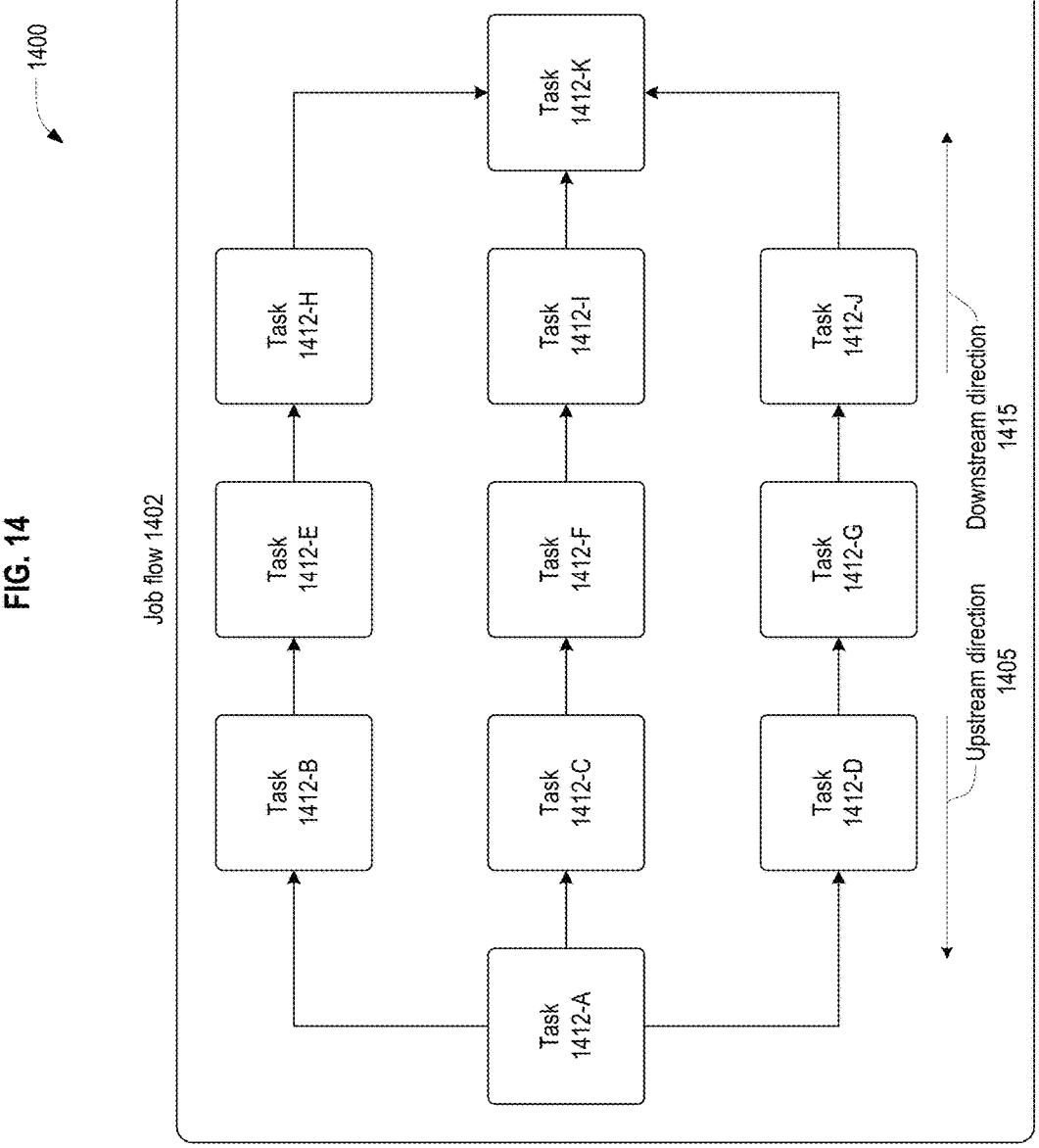
FIG. 14 illustrates various aspects of a first exemplary job flow, according to some embodiments of the present technology.

FIG. 14 illustrates various aspects of a job flow 1402 in environment 1400 that may be representative of various embodiments. In environment 1400, job flow 1402 may include a set of tasks comprising task 1412-A, task 1412-B, task 1412-C, task 1412-D, task 1412-E, task 1412-F, task 1412-G, task 1412-H, task 1412-I, task 1412-J, task 1412-K (or tasks 1412). Additionally, the job flow 1402 may include an upstream direction 1405 and a downstream direction 1415. In several embodiments, a job flow (e.g., job flow 1402) may include a set of tasks (e.g., tasks 1412) and their dependencies. In some embodiments, tasks in a job flow may be referred to as jobs. In many embodiments, job flow 1402 is completed by performing every task therein. In one or more embodiments described herein, tasks 1412 in job flow 1402 may be ordered such that performing the tasks according to the order results in a reduce completion time for the job flow 1402. Embodiments are not limited in this context.

As shown in FIG. 14, the set of tasks may include a dependency structure with tasks connected in the upstream direction 1405 having to be completed prior to tasks in the down stream direction 1415. For example, task 1412-A has to be completed before task 1412-B can be performed and task 1412-B has to be completed before task 1412-E can be performed. In another example, task 1412-G, 1412-D, and 1412-A have to be completed before task 1412-J can be performed. It will be appreciated that the job flow 1402 is exemplary and a job flow can take any form of dependency structure without departing from the scope of this disclosure. Additional examples of job flows are provided in FIGS. 22-24B and will be described in more detail below. In some embodiments, task dependencies for a specific task may refer only to the tasks that the specific task directly depends from (e.g., is directly connected to in the upstream direction 1405). For instance, the task dependencies for task 1412-I may only include task 1412-F although task 1412-I indirectly depends from tasks 1412-A, 1412-C, 1412-F.

In various embodiments, a list of distinct dependencies for a job flow (e.g., job flow 1402) may include each task in the job flow that includes at least one dependency in the downstream direction 1415. For example, the list of distinct dependencies for job flow 1402 would include each task except task 1412-K (i.e., tasks 1412-A, 1412-B, 1412-C, 1412-D, 1412-E, 1412-F, 1412-G, 1412-H, 1412-I, 1412-J). In some embodiments, end of chain tasks or possible ends to the job flow may include any tasks in the job flow that are not included in the list of distinct dependencies. For example, the end of chain tasks or possible ends to the job flow 1402 may include task 1412-K.

Figure 15A:
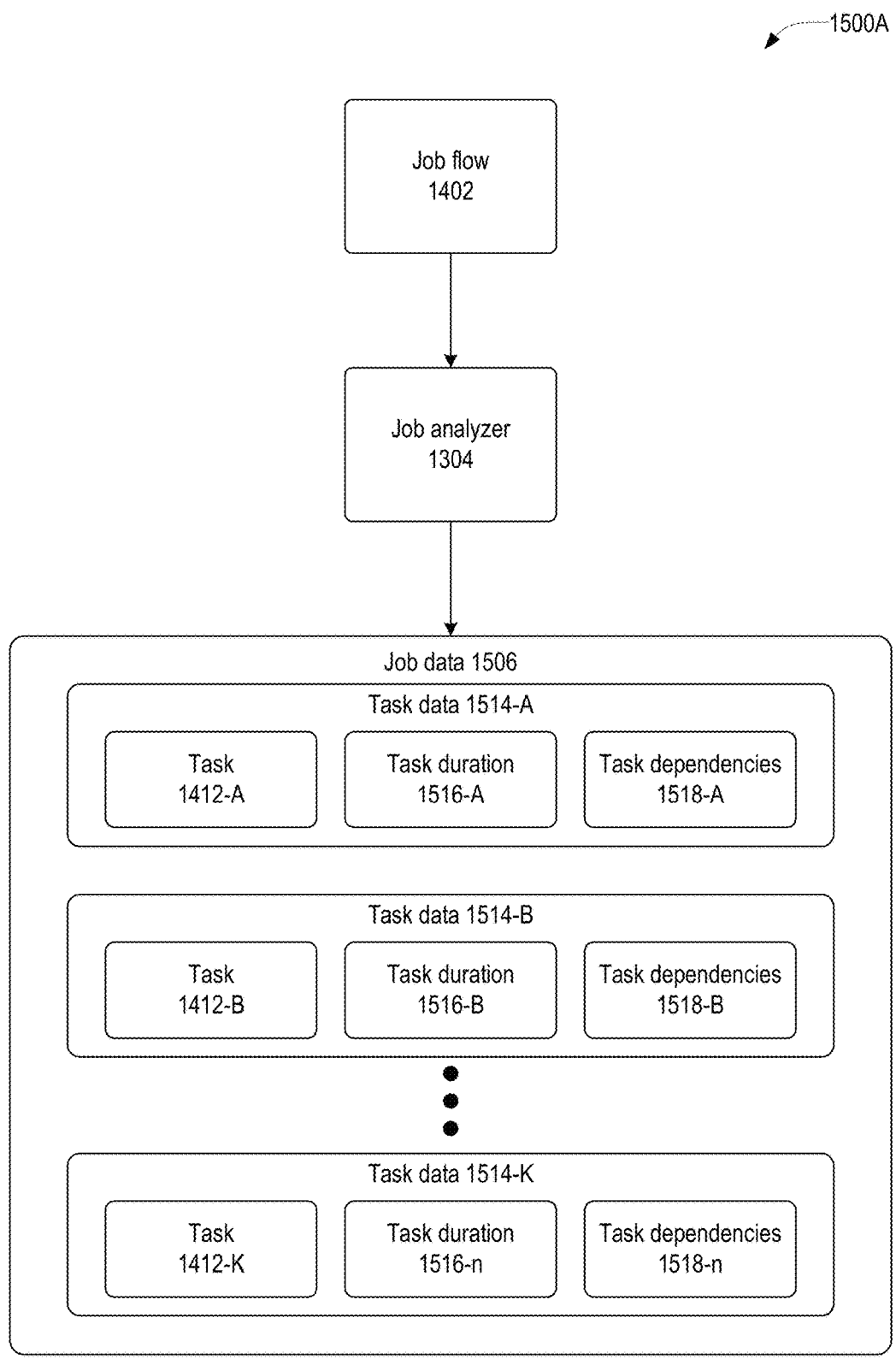

FIGS. 15A and 15B illustrate various aspects of job data 1506 in environments 1500A, 1500B that may be representative of various embodiments. In environment 1500A, job data 1506 is produced by job analyzer 1304 based on job flow 1402. In many embodiments, job data may include task data associated with each task in a job flow. In the illustrated embodiment, task data may include a task, a task duration, and task dependencies. In some embodiments, job analyzer 1304 may format job flow 1402 into job data 1506 and/or calculate one or more portions of the task data based on the job flow. For example, job analyzer 1304 may reformat task dependencies graphically identified in job flow 1402 of FIG. 14 into a listing of task dependencies 1518 shown in FIG. 15B. In another example, job analyzer 1304 may calculate task durations for one or more tasks in a job flow, such as via trial runs. In some embodiments, task durations, makespans, and/or other parameters (e.g., LPE values or TRUE values) can be computed one or more times. For example, tasks may be added/removed from a job flow. In such examples, the addition/removal of tasks from a job flow may cause updated task durations, makespans, and/or other parameters to be computed. As previously mentioned, in various embodiments, a job flow may be equivalent to job data, removing the need for job analyzer 1304. Embodiments are not limited in this context.

In several embodiments, job data 1506 may include task data for each task in a job flow. In the embodiment illustrated in FIG. 15A, only task data for tasks 1412-A, 1412-B, and 1412-K are explicitly illustrated for simplicity. Accordingly, task data 1514-A associated with task 1412-A includes a task duration 1516-A for the task 1412-A and a set of task dependencies 1518-A for the task 1412-A, task data 1514-B associated with task 1412-B includes a task duration 1516-B for the task 1412-B and a set of task dependencies 1518-B for the task 1412-B, and task data 1514-K associated with task 1412-K includes a task duration 1516-K for the task 1412-K and a set of task dependencies 1518-K for the task 1412-K.

Referring to FIG. 15B, in some embodiments, task data 1514 in job data 1506 for all the tasks in job flow 1402 may be stored in a single data structure, such as a table. In environment 1500B, job data 1506 may include a column for tasks 1412, a column for task durations 1516, and a column for task dependencies 1518. In various embodiments, each of the task durations 1516 may be associated with a unit of time or period, such as minutes, seconds, computer clock cycles, or the like. In many embodiments, the task dependencies 1518 may refer to direct, or immediately preceding, upstream dependencies. In various embodiments, job data 1506 of FIG. 15B may be representative or correspond to job flow 1402 of FIG. 14.

Accordingly, task 1412-A may be associated with a task duration 1516-A of 10 and no task dependencies 1518-A, task 1412-B may be associated with a task duration 1516-B of 40 and one task dependency 1518-B to task 1412-A, task 1412-C may be associated with a task duration 1516-C of 40 and one task dependency 1518-C to task 1412-A, task 1412-D may be associated with a task duration 1516-D of 30 and one task dependency 1518-D to task 1412-A, task 1412-E may be associated with a task duration 1516-E of 40 and one task dependency 1518-E to task 1412-B, task 1412-F may be associated with a task duration 1516-F of 140 and one task dependency 1518-F to task 1412-C, task 1412-G may be associated with a task duration 1516-G of 120 and one task dependency 1518-G to task 1412-D, task 1412-H may be associated with a task duration 1516-H of 40 and one task dependency 1518-H to task 1412-E, task 1412-I may be associated with a task duration 1516-I of 40 and one task dependency 1518-I to task 1412-F, task 1412-J may be associated with a task duration 1516-J of 120 and one task dependency 1518-J to task 1412-G, task 1412-K may be associated with a task duration 1516-K of 30 and three task dependencies 1518-K includes tasks 1412-H, 1412-I, 1412-J.

Figure 16:
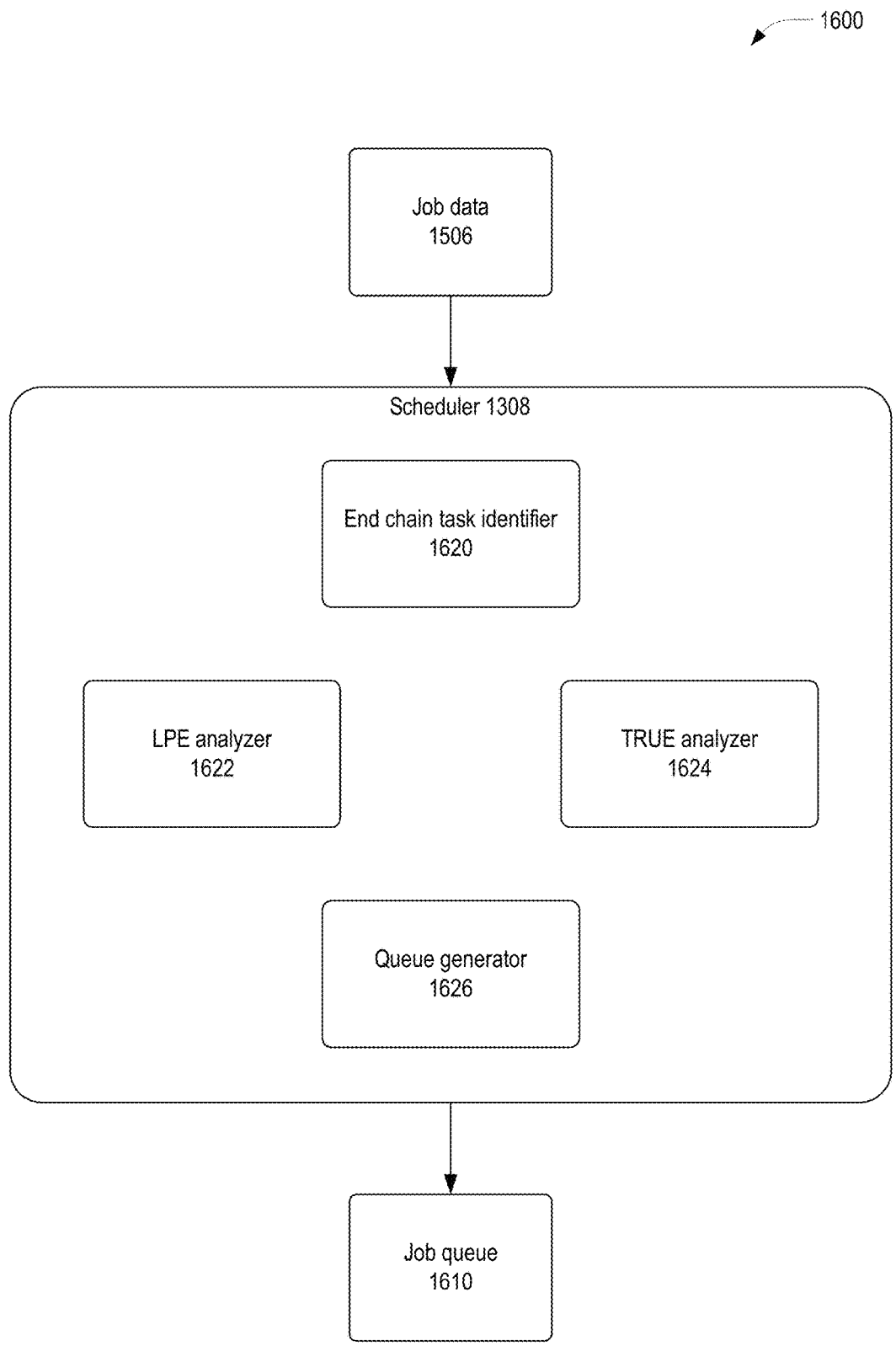
FIG. 16 illustrates various aspects of an exemplary scheduler, according to some embodiments of the present technology.

FIG. 16 illustrates various aspects of scheduler 1308 in environment 1600 that may be representative of various embodiments. In environment 1600, scheduler 1308 may include an end chain task identifier 1620, a longest path to end (LPE) analyzer 1622, a time remaining until end (TRUE) analyzer 1624, and a queue generator 1626. In various embodiments, scheduler 1308 may receive job data 1506 associated with job flow 1402, or a properly formatted job flow that includes task durations, as input and generate job queue 1610 as output. In one or more embodiments described herein, job queue 1610 may include a prioritized list of tasks in job data 1506. In one or more such embodiments, performing the tasks according to the job queue 1610 can minimize the makespan for the job flow 1402. Embodiments are not limited in this context.

In many embodiments, scheduler 1308 may identify and prioritize tasks along a critical path of the job flow using one or more metrics computed for tasks in a job flow. As will be described in more detail below, in various embodiments, a critical path of a job flow may refer to a longest running path in the job flow. In several embodiments, computing an LPE with LPE analyzer 1622 and/or a TRUE value with TRUE analyzer 1624 for each task in a job flow may enable a listing of tasks in the job flow to be ordered in a manner that prioritizes tasks to optimize the makespan for the job flow.

In many embodiments, an LPE for a respective task may include a list of tasks (based upon dependencies in the job flow) that need to be performed after the respective task to get to the end of the job flow (when multiple paths to get to the end of the job flow are present, the path with the longest duration is chosen). In many such embodiments, the end of the job flow may occur after performance of one of the end chain tasks indicated by the end chain task identifier 1620. In one or more embodiments, a TRUE value for a respective task may include a summation of all the durations of the tasks along the LPE. In various embodiments, the LPE of the task with the largest TRUE value among the tasks in the job flow may identify the critical path. In some embodiments, the job queue 1610 may include a listing of tasks in the job flow sorted (e.g., by queue generator 1626) from the highest TRUE value to the smallest TRUE value.

Figure 17:
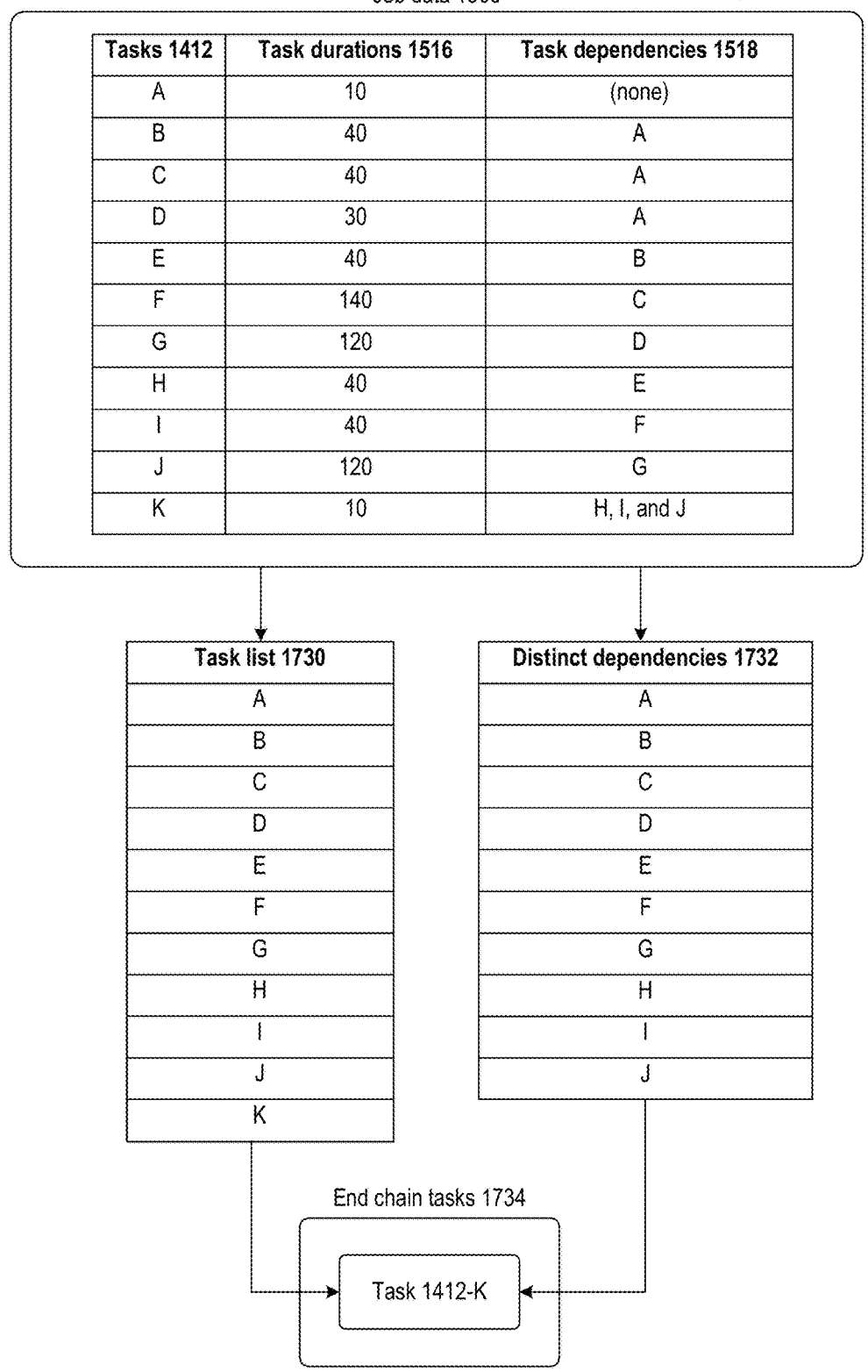
FIG. 17 illustrates various aspects of identifying end chain tasks, according to some embodiments of the present technology.

FIG. 17 illustrates various aspects of identifying end chain tasks 1734 in environment 1700 that may be representative of various embodiments. In environment 1700, a task list 1730 and distinct dependencies 1732 may be identified from job data 1506. In one or more embodiments described herein, the task list 1730 and distinct dependencies 1732 may be compared to identify the end chain tasks 1734. In some embodiments, one or more aspects of identifying end chain tasks 1734 may be performed by scheduler 1308, such as with end chain task identifier 1620. Embodiments are not limited in this context.

In several embodiments, task list 1730 may include a listing of all the tasks in a job flow (e.g., job flow 1402). In several such embodiments, the task list 1730 may be identified from the job data 1506, or the job flow 1402. As illustrated in FIG. 17, the task list 1730 for job data 1506 and/or job flow 1402 may include tasks A-K. In various embodiments, distinct dependencies 1732 for a job flow (e.g., job flow 1402) may include each task in the job flow that includes at least one dependency in the downstream direction 1415. Accordingly, the distinct dependencies for job flow 1402 would include each task except task 1412-K (i.e., tasks 1412-A, 1412-B, 1412-C, 1412-D, 1412-E, 1412-F, 1412-G, 1412-H, 1412-I, 1412-J). In some embodiments, end of chain tasks 1734 or possible ends to the job flow may include any tasks in the job flow that are not included in the list of distinct dependencies. For example, the end of chain tasks 1734 or possible ends to the job flow 1402 may include task 1412-K.

Figure 18B:
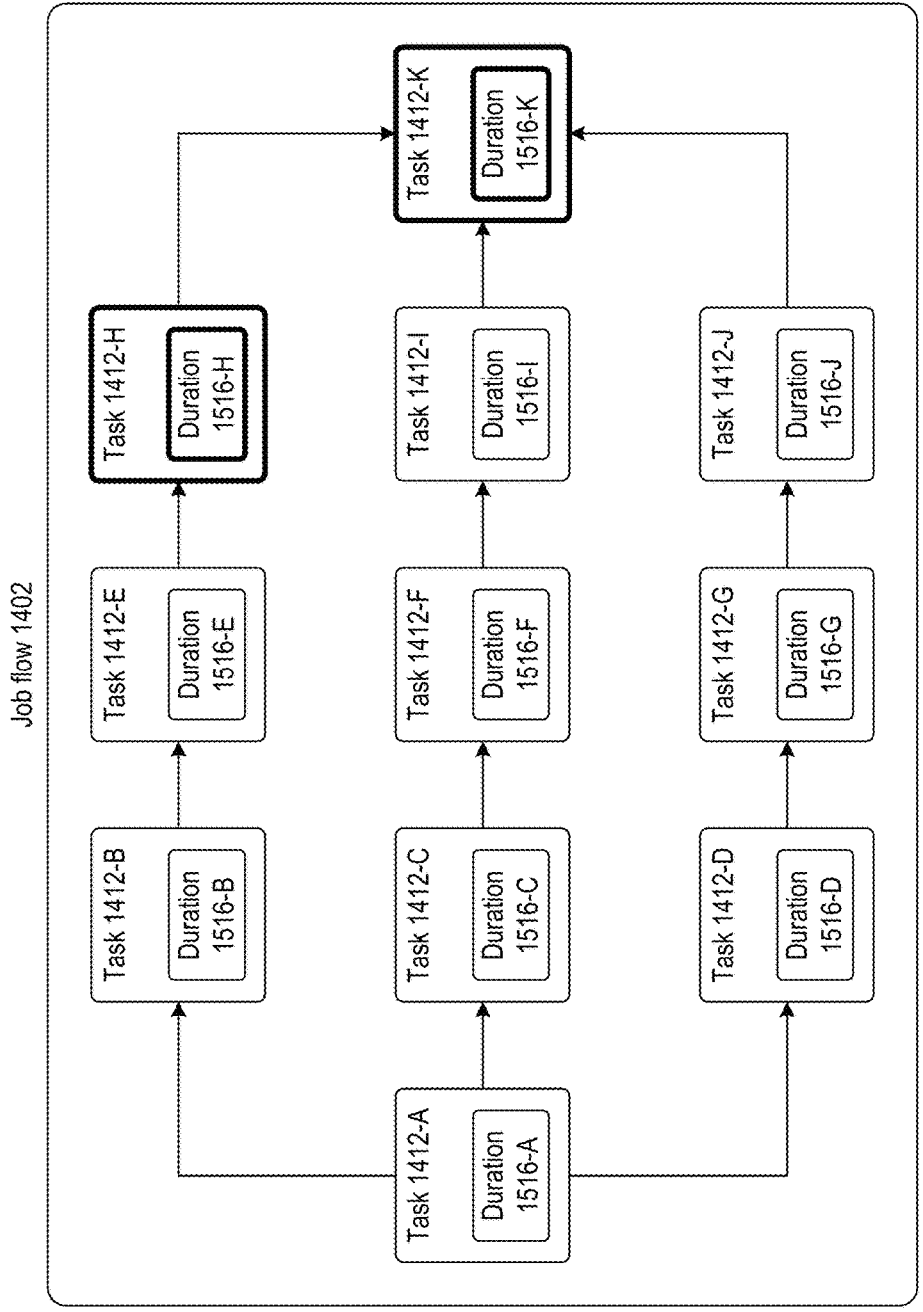
Figure 18C:
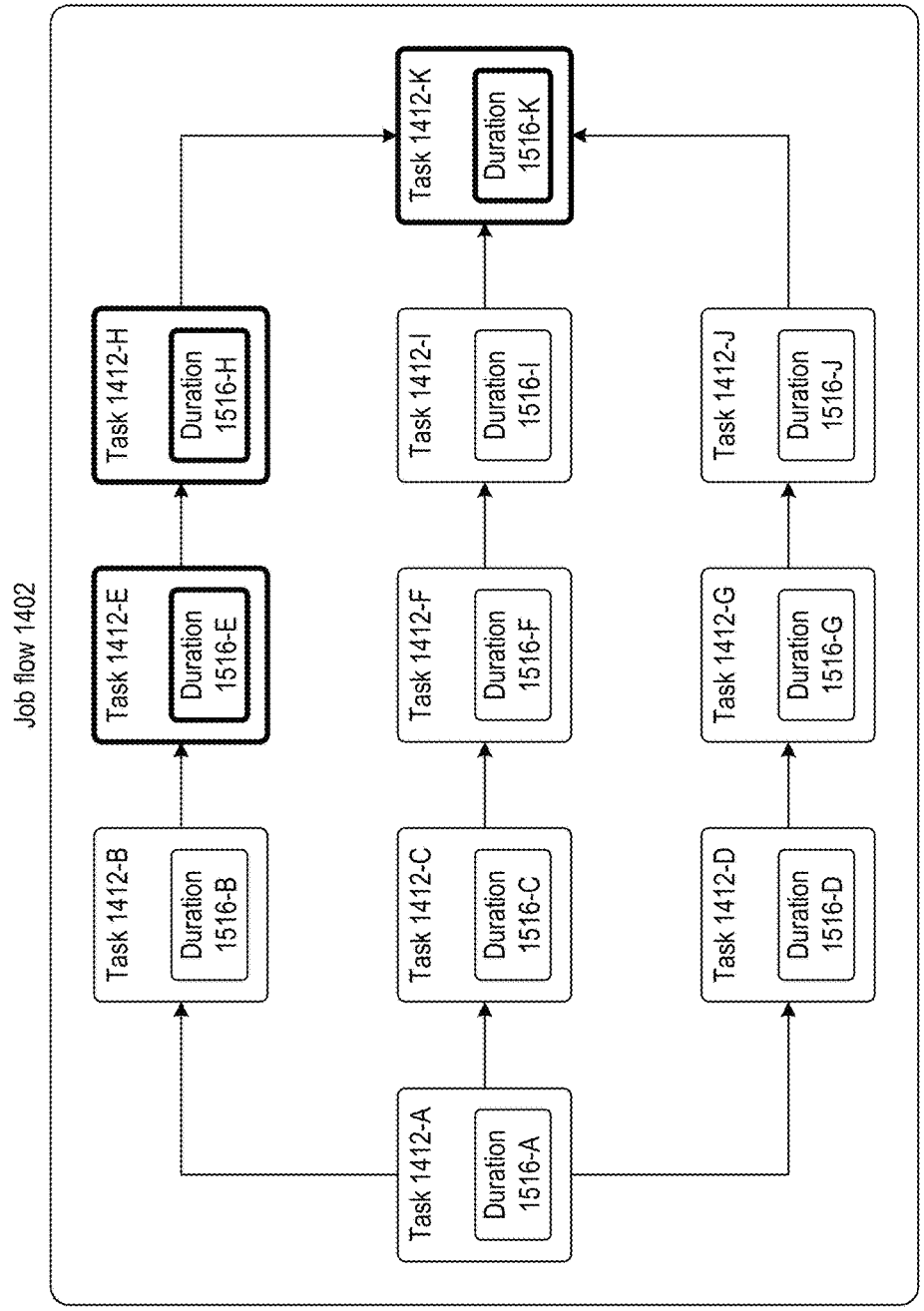

FIGS. 18A-18C illustrate various aspects of computing metrics for tasks in job flow 1402 in environments 1800A, 1800B, 1800C that may be representative of various embodiments. In some embodiments, computing metrics for tasks in a job flow, such as LPE and TRUE values for each task, may be part of prioritizing performance of the tasks. In several embodiments, one or more aspects described with respect to FIGS. 18A-18C may be performed or implemented by components of the scheduler 1308, such as LPE analyzer 1622 and TRUE analyzer 1624. In many embodiments, computing metrics in a job flow may begin at the end chain tasks. For example, from a respective end chain task, the duration may be held as each possible path upstream from the respective end chain task is identified/evaluated. For clarity, FIGS. 18A-18C only illustrate partially moving along one path upstream from task 1412-K toward task 1412-A. However, the same logic/procedures can be applied to other upstream paths. Embodiments are not limited in this context.

In several embodiments, to calculate the TRUE value for a respective task, the duration of the respective task may be added to the maximum TRUE value for all tasks with the respective task as an immediate dependency. In various embodiments, the step may reduce to a pseudoforest of the subgraph from the respective task to the end of the job flow. Similarly, the LPE for a respective task may be the LPE for the task with the largest TRUE value among all tasks with an immediate dependency from the respective task. In various embodiments, one or more of these processes may be repeated to reduce the job flow to a set of Euler paths from the start to the end (see e.g., FIGS. 19A-19C).

Referring to FIG. 18A, the process may begin with the only end chain task of job flow 1402, task 1412-K. In several embodiments, the LPE, or longest path until end, for task 1412-K is identified as task 1412-K because task 1412-K is the only task that needs to be performed to get to the end of the job flow 1402. In several such embodiments, this analysis may be performed by LPE analyzer 1622. Further, the TRUE value, or time remaining until end value, for task 1412-K would include the sum of the durations for all the tasks along the LPE for task 1412-K. As task 1412-K is the only task in the LPE, the TRUE value for task 1412-K would be the duration 1516-K for task 1412-K, 10. In various embodiments, this analysis may be performed by TRUE analyzer 16240.

Referring to FIG. 18B, proceeding from task 1412-K, task 1412-H may be analyzed next. The LPE and TRUE value for task 1412-H may be computed as follows. In various embodiments, the LPE for task 1412-H may be tasks 1412-H, 1412-K. In various such embodiments, tasks 1412-H, 1412-K may be the LPE for task 1412-H because they include the only path to the end of the job flow from task 1412-H. However, if multiple paths to the end exist, the LPE would include the path to the end with the longest total duration (this aspect will be discussed in more detail with respect to FIGS. 19A-19C). The TRUE value for task 1412-H would be the duration 1516-K for task 1412-K, 10, plus the duration 1516-H for task 1412-H, 40. Thus, the TRUE value for task 1412-H would be 10 plus 40, or 50. It will be appreciated that the actual duration 1516-K does not need to be summed again. Instead, the duration 1516-H can simply be added to the TRUE value for task 1412-K. The benefits of this will become more apparent with respect to FIG. 18C.

Referring to FIG. 18C, proceeding from task 1412-H, task 1412-E may be analyzed next. The LPE and TRUE value for task 1412-E may be computed as follows. In various embodiments, the LPE for task 1412-E may be tasks 1412-E, 1412-H, 1412-K. In various such embodiments, tasks 1412-E, 1412-H, 1412-K may be the LPE for task 1412-H because they include the only path to the end of the job flow from task 1412-E. However, if multiple paths to the end exist, the LPE would include the path to the end with the longest total duration (this aspect will be discussed in more detail with respect to FIGS. 19A-19C). The TRUE value for task 1412-E would be the duration 1516-K for task 1412-K, 10, plus the duration 1516-H for task 1412-H, 40, plus the duration 1516-E of task 1412-E, 40. Thus, the TRUE value for task 1412-E would be 10 plus 40 plus 40, or 90. It will be appreciated that the durations 1516-H, 1516-K do not need to be summed again. Instead, the duration 1516-E can be added to the TRUE value for task 1412-H to simplify computation of the TRUE value for task 1412-E. In various embodiments, this process for computing the LPE and TRUE values can be repeated for each task in job flow 1402. Resulting in three paths between task 1412-A and task 1412-K, as shown in FIGS. 19A-19C, respectively.

Figure 19A:
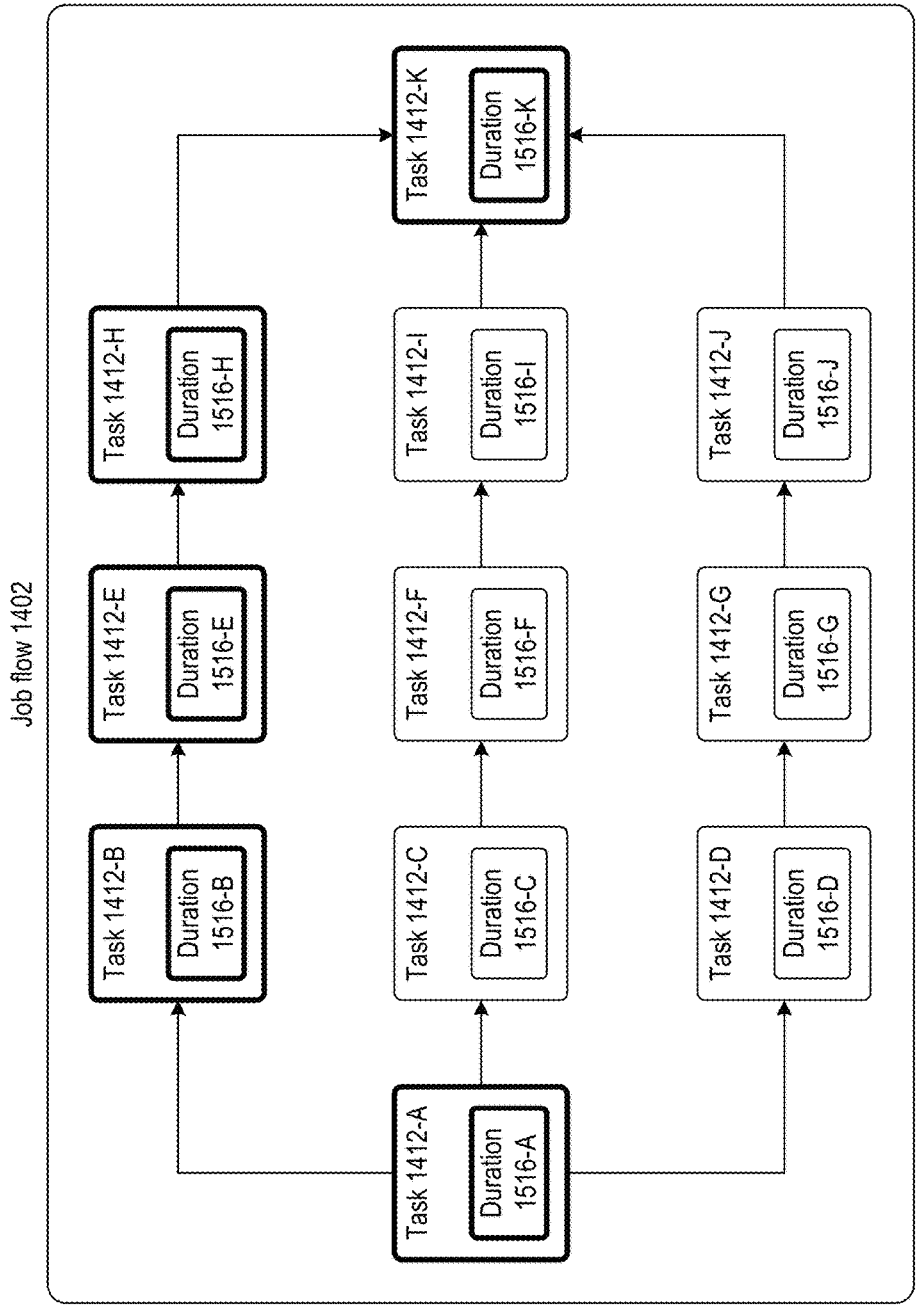
FIGS. 19A-19C illustrate various aspects of computing metrics in job flow processing, according to some embodiments of the present technology.
Figure 19B:
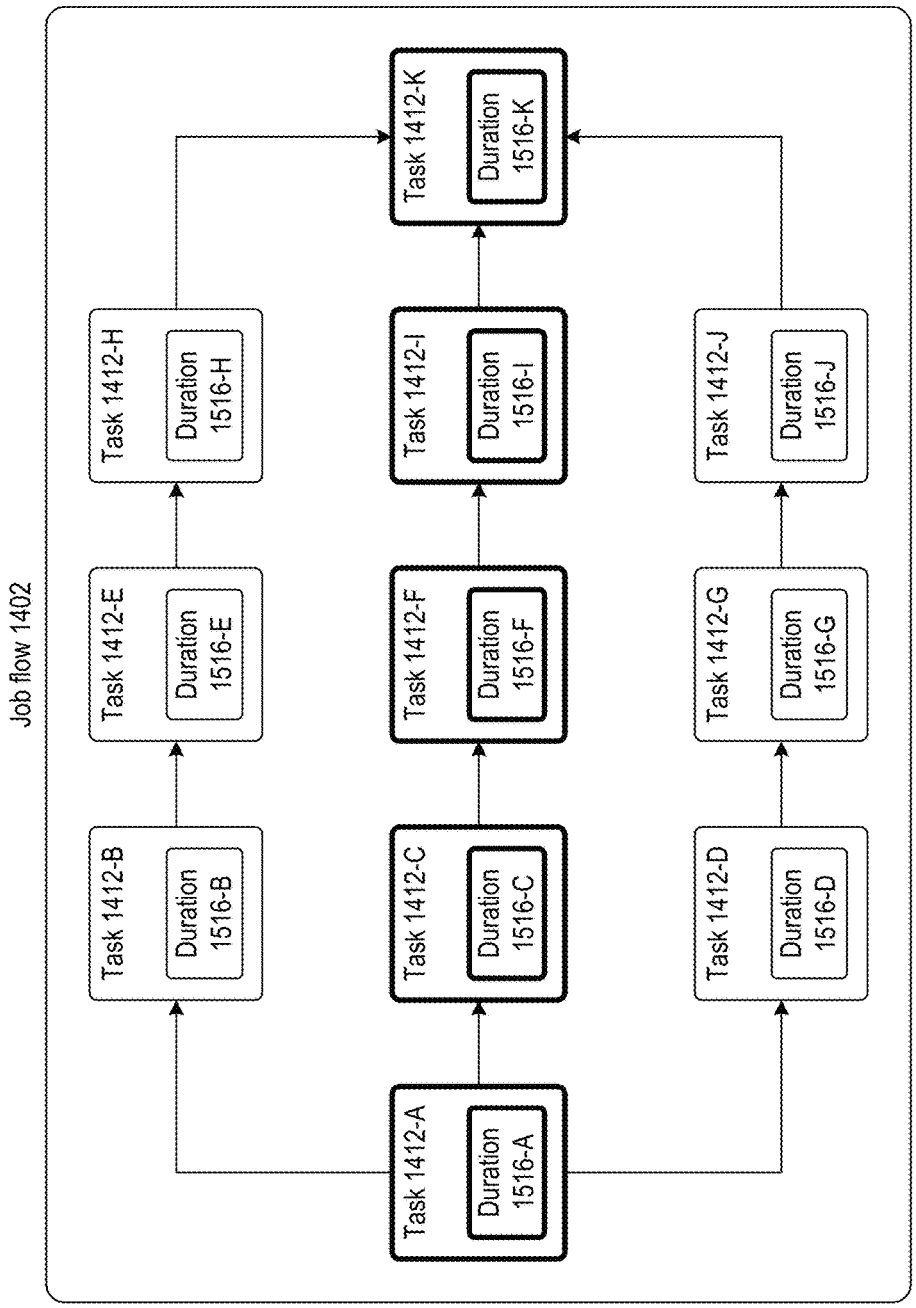
Figure 19C:
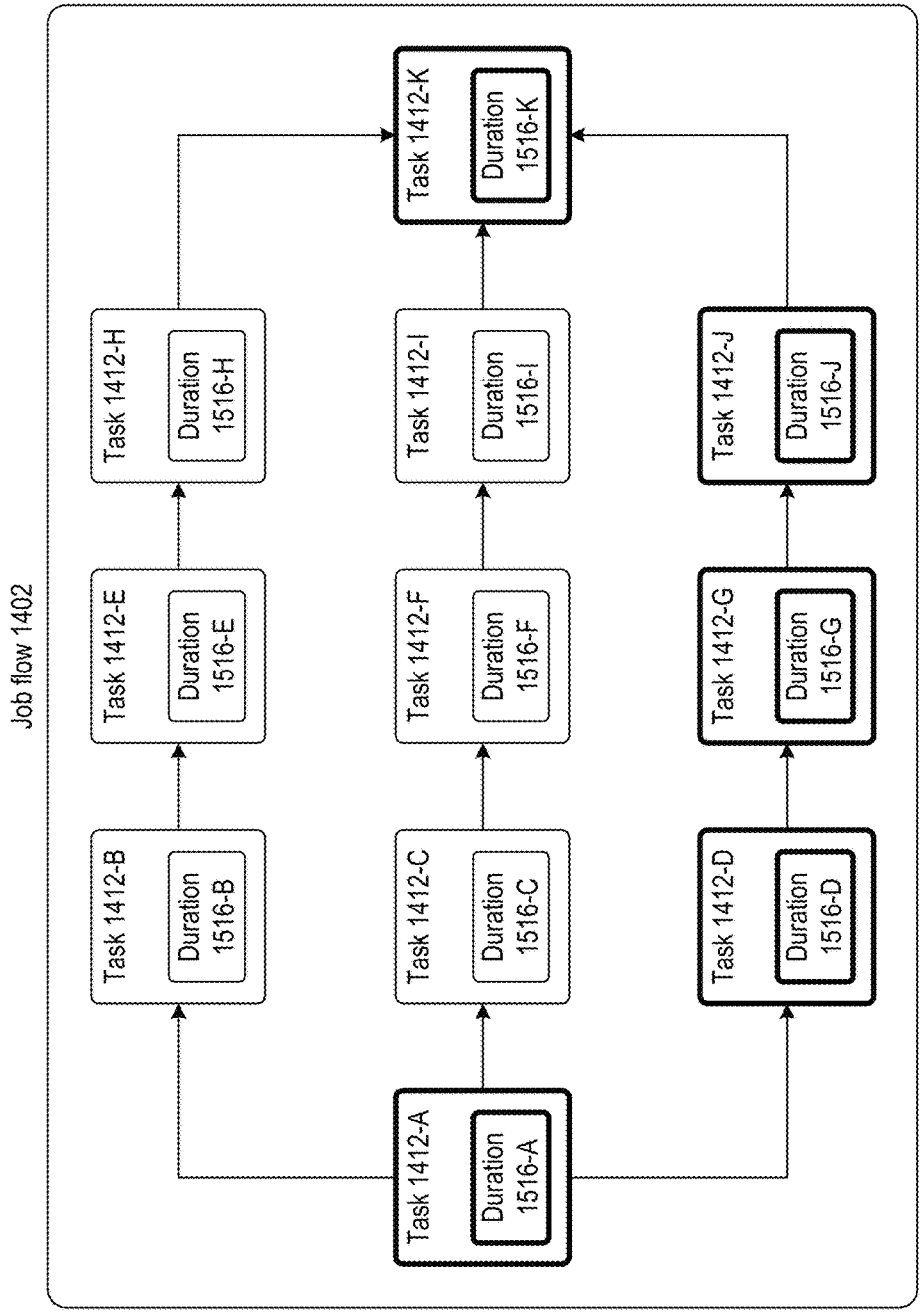

FIGS. 19A-19C illustrate various aspects of computing metrics for tasks in job flow 1402 in environments 1900A, 1900B, 1900C that may be representative of various embodiments. In some embodiments, computing metrics for tasks in a job flow, such as LPE and TRUE values for each task, may be part of prioritizing performance of the tasks. In several embodiments, one or more aspects described with respect to FIGS. 19A-19C may be performed or implemented by components of the scheduler 1308, such as LPE analyzer 1622 and TRUE analyzer 1624. In many embodiments, computing metrics in a job flow may begin at the end chain tasks. For example, from a respective end chain task, the duration may be held as each possible path upstream from the respective end chain task is identified/evaluated. FIGS. 19A-19C only illustrate computing metrics for task 1412-A to clearly describe aspects of computing metrics for a task with multiple paths to the end. The same logic/procedures may be applied to any task with multiple paths to the end of a job flow. Embodiments are not limited in this context.

In various embodiments, to calculate the LPE and TRUE value for task 1412-A, each possible path to end must be considered. As described in part with respect to FIGS. 18A-18C, prior to computing the LPE and TRUE value for task 1412-A, the LPE and TRUE values for each of tasks 1412-B, 1412-C, 1412-D, 1412-E, 1412-F, 1412-G, 1412-H, 1412-I, 1412-J, 1412-K may been computed as part of recursing from end chain task 1412-K to the beginning of job flow 1402. Accordingly, the LPE and TRUE value for task 1412-B may be B-E-H-K and 130, respectively (see FIG. 19A), the LPE and TRUE value for task 1412-C may be C-F-I-K and 230, respectively (see FIG. 19B), and the LPE and TRUE value for task 1412-D may be D-G-J-K and 280, respectively (see FIG. 19C).

As previously mentioned, in several embodiments, to calculate the TRUE value for a respective task, the duration of the respective task may be added to the maximum TRUE value for all tasks with the respective task as an immediate dependency. Similarly, the LPE for a respective task may be the LPE for the task with the largest TRUE value among all tasks with an immediate dependency from the respective task. Accordingly, task 1412-D would be identified as the task with the maximum TRUE value that immediately depends from task 1412-A. Therefore, the LPE for task 1412-A would include the LPE for task 1412-D with the addition of task 1412-A, or A-D-G-J-K, and the TRUE value for task 1412-A would include the TRUE value for task 1412-D plus the duration 1516-A for task 1412-A, or 290, which is equivalent to the sum of durations 1516-A, 1516-D, 1516-G, 1516-J, 1516-K.

Figure 20A:
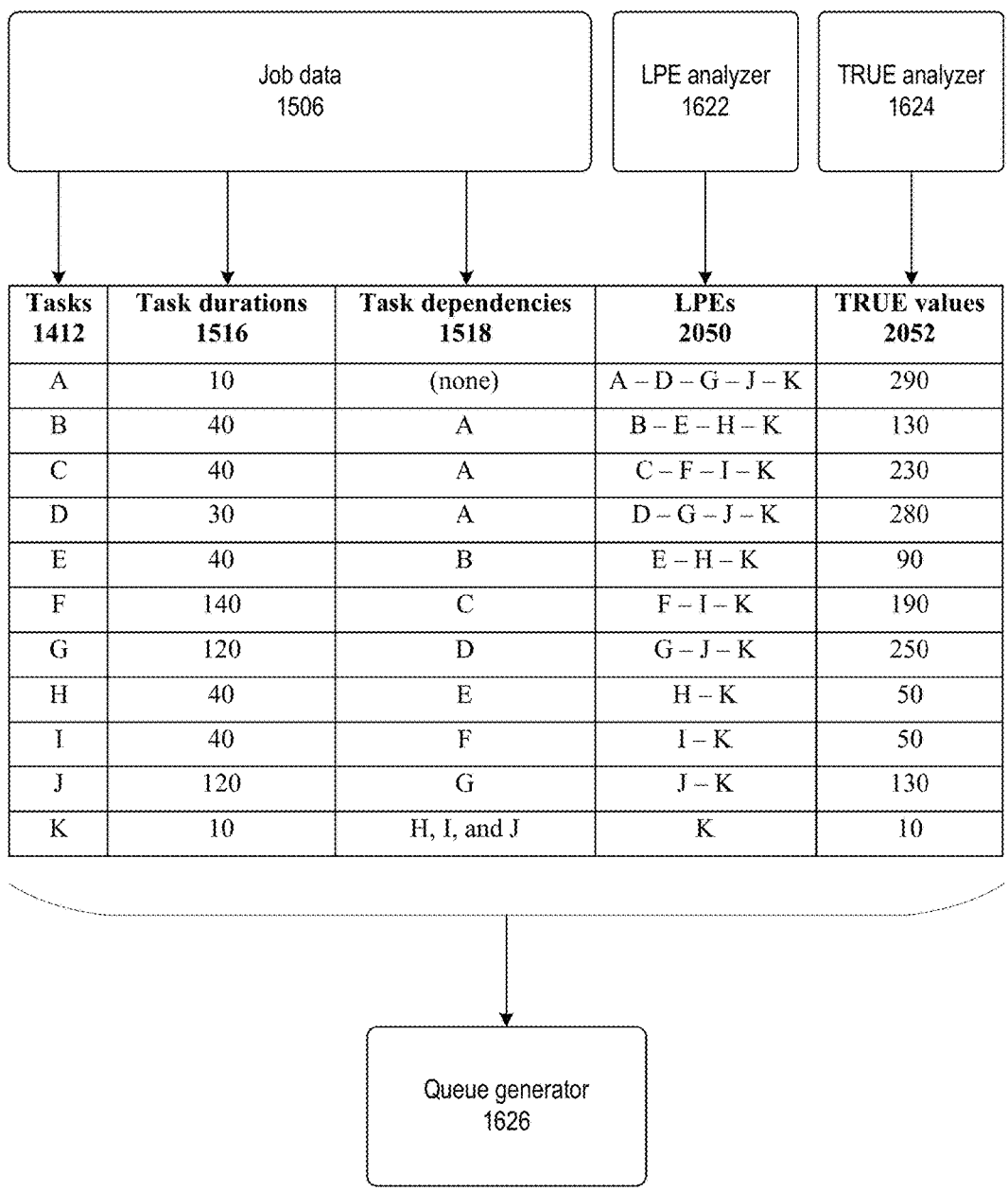
FIGS. 20A and 20B illustrate various aspects of generating a job queue, according to some embodiments of the present technology.
Figure 20B:
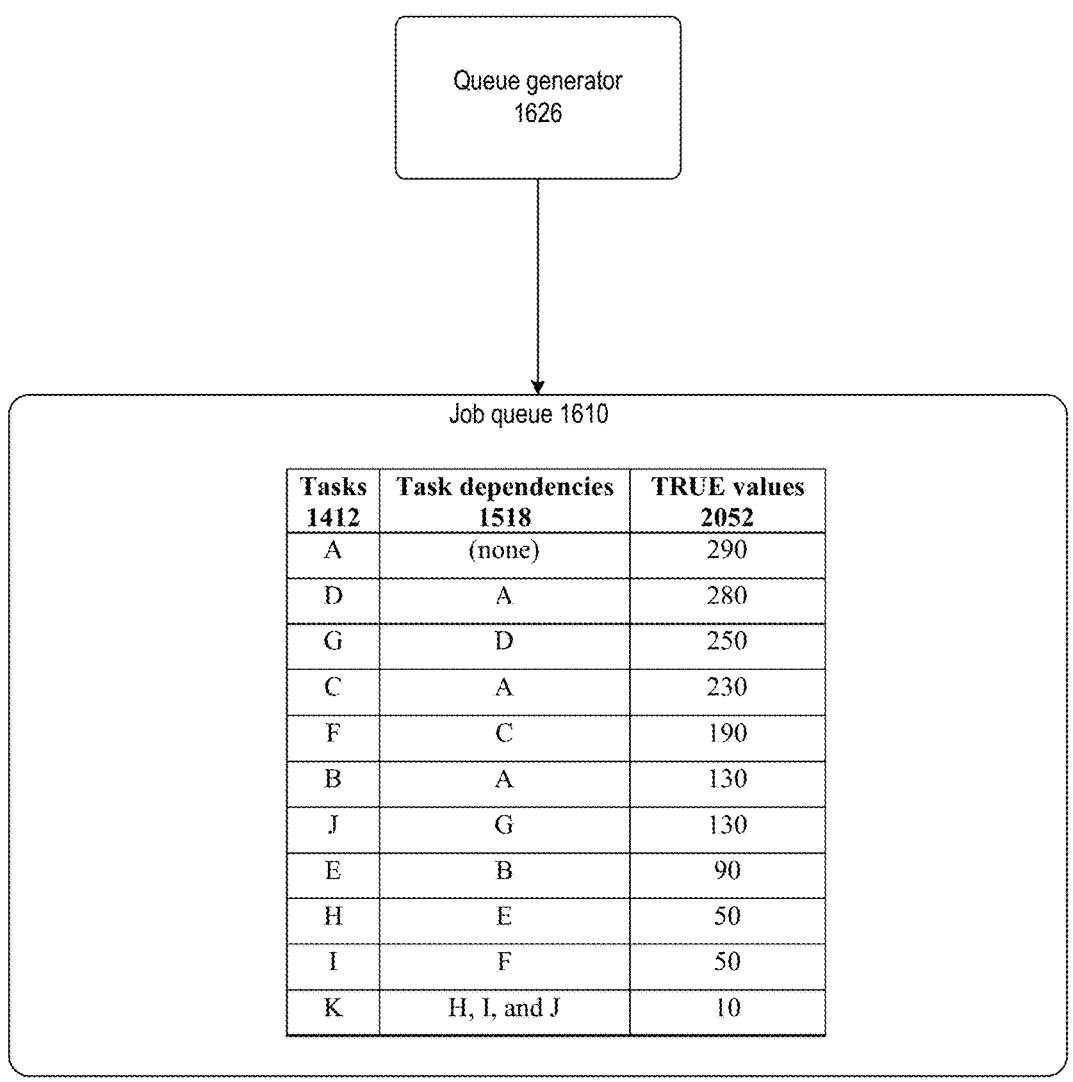

FIGS. 20A and 20B illustrate various aspects of generating a job queue 1610 in environments 2000A, 2000B that may be representative of various embodiments. In many embodiments, environment 2000A illustrates input provided to queue generator 1626 to produce job queue 1610 and environment 2000B illustrates the job queue 1610 produced by queue generator 1626 based on the input. Referring to FIG. 20A, in some embodiments, the input may comprise a data structure, such as a table, that includes tasks 1412, task durations 1516, and task dependencies 1518 from job data 1506, LPEs 2050 from LPE analyzer 1622, and TRUE values 2052 from TRUE analyzer 1624. In other embodiments, more or less data may be provided to the queue generator. For example, only tasks 1412 and TRUEs 2052 may be provided to the queue generator 1626. Referring to FIG. 20B, in various embodiments, queue generator 1626 may order the tasks provided as input from the highest TRUE value to the lowest TRUE value and output the ordered list as job queue 1610. In many embodiments, the task at the top of the job queue 1610 (i.e. the task with the highest TRUE value) may be the starting task for performance of the job flow 1402. In various embodiments, the job queue 1610 may include a data structure, such as a table, that includes tasks 1412, task dependencies 1518, and TRUE values 2052. In various such embodiments, the job queue 1610 may include task dependencies 1518 to enable a task assignor that is provided the job queue 1610 to assign tasks to task executors while taking task dependencies into account. Embodiments are not limited in this context.

Figure 21:
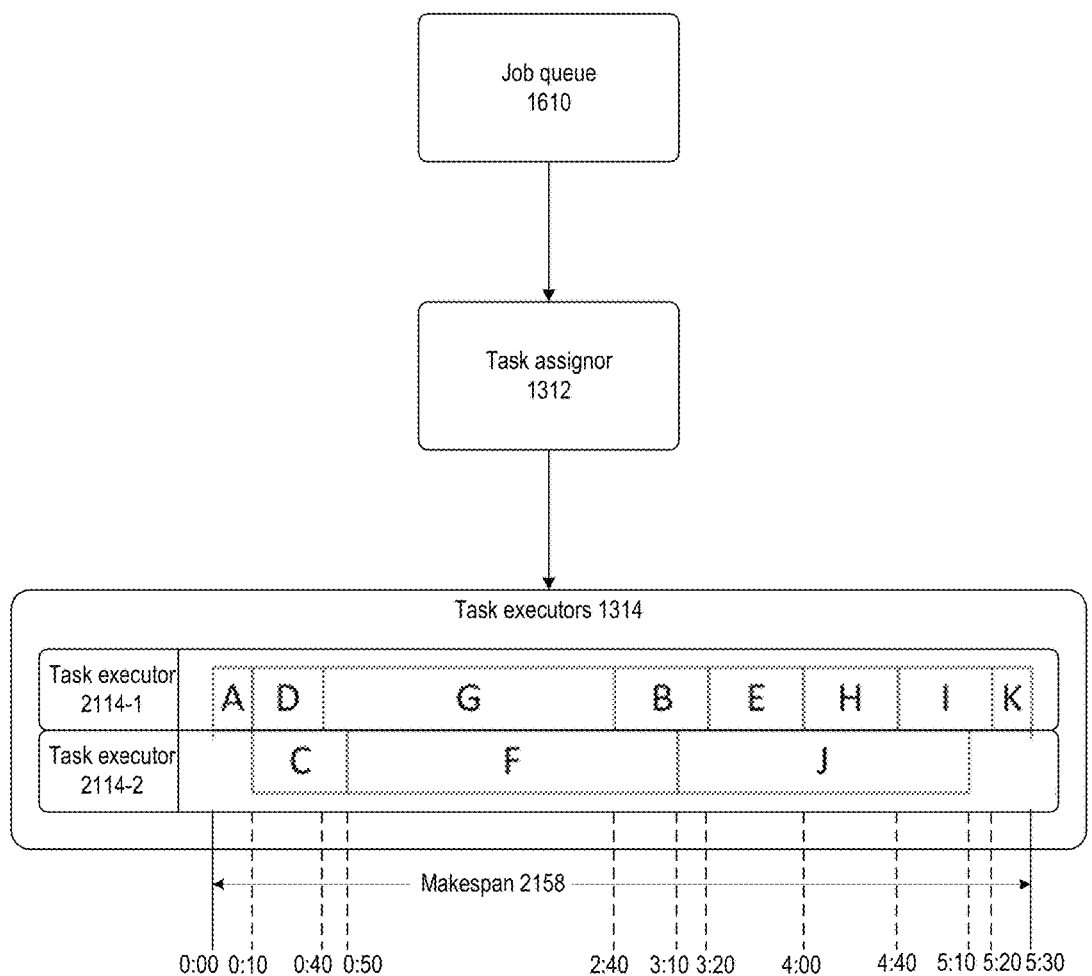
FIG. 21 illustrates various aspects of an exemplary task assignor, according to some embodiments of the present technology.

FIG. 21 illustrates various aspects of a task assignor 1312 in environment 2100 that may be representative of various embodiments. In environment 2100, job queue 1610 may be provided to task assignor 1312 for assignment to task executors 1314. In many embodiments, the task at the top of the job queue 1610 (i.e. the task with the highest TRUE value) may be assigned for performance first. In several embodiments, the task assignor 1312 may assign the highest unassigned task in the job queue 1610 with all dependencies satisfied when a task executor becomes available. In the illustrated embodiments, there are two task executors 2114-1, 2114-2. However, any number of task executors may be available for task assignment from task assignor 1312. In some embodiments, the number of task executors may change in the middle of the performance of a job flow. For example, a task executor may fail, or an additional task executor may be added. In various embodiments, task assignor 1312 will assign the highest task in the job queue for which all the dependencies have been met to any and all task executors that are available for a task assignment. This process may continue until all of the tasks in a job flow have been assigned and/or completed. Embodiments are not limited in this context.

In the illustrated embodiment, at time 0:00, task assignor 1312 may assign task 1412-A to task executor 2114-1 because task 1412-A is at the top of the job queue 1610. However, because every other task is dependent on task 1412-A, task executor 2114-2 remains idle until task 1412-A is completed. In some embodiments, task assignment between multiple idle task executors may be arbitrarily determined. In other embodiments, one or more factors may be utilized to determine which of multiple idle task executors to assign a task to. For example, multiple task executors may be implemented on a single computing device and the number of active task executors on different computing devices with idle task executors may be considered in assigning a subsequent task. Upon completion of task 1412-A, task assignor 1312 may assign the next highest task in the job queue 1610 that has all of its dependencies met. Accordingly, task 1412-D may be assigned to task executor 2114-1 at time 0:10. Next, or in parallel, task assignor 1312 may assign task 1412-C to task executor 2114-2 at time 0:10. Although task 1412-G is higher in the task queue 1610 than task 1412-C, all of the task dependencies 1518 for task 1412-G have not been met because task 1412-G is dependent on the completion of task 1412-D. Therefore, task 1412-C is the highest task in task queue 1610 that can be assigned once task dependencies 1518 are taken into account.

At time 0:40, task executor 2114-1 may become idle after finishing task 1412-D. Thus, task assignor 1312 may assign task 1412-G to task executor 2114-1 because its dependency on task 1412-D has now been satisfied. Next, at time 0:50, task 1412-F may be assigned to task executor 2114-2. At time 2:40, task 1412-B may be assigned to task executor 2114-1 upon completion of task 1412-G. At time 3:10, task 1412-J may be assigned to task executor 2114-2 upon completion of task 1412-F. At time 3:20, task 1412-E may be assigned to task executor 2114-1 upon completion of task 1412-B. At time 4:00, task 1412-H may be assigned to task executor 2114-1 upon completion of task 1412-E. At time 4:40, task 1412-I may be assigned to task executor 2114-1 upon completion of task 1412-H. At time 5:10, task executor 2114-2 may become idle. However, because all of the dependencies for the last remaining un assigned task (i.e., task 1412-K) have not been met, task executor 2114-2 may remain idle. At time 5:20, task 1412-K may be assigned to task executor 2114-1 upon completion of task 1412-I. Upon completion of task 1412-K, the job flow 1402 is completed with a makespan 2158 of 5:30.

Figure 22:
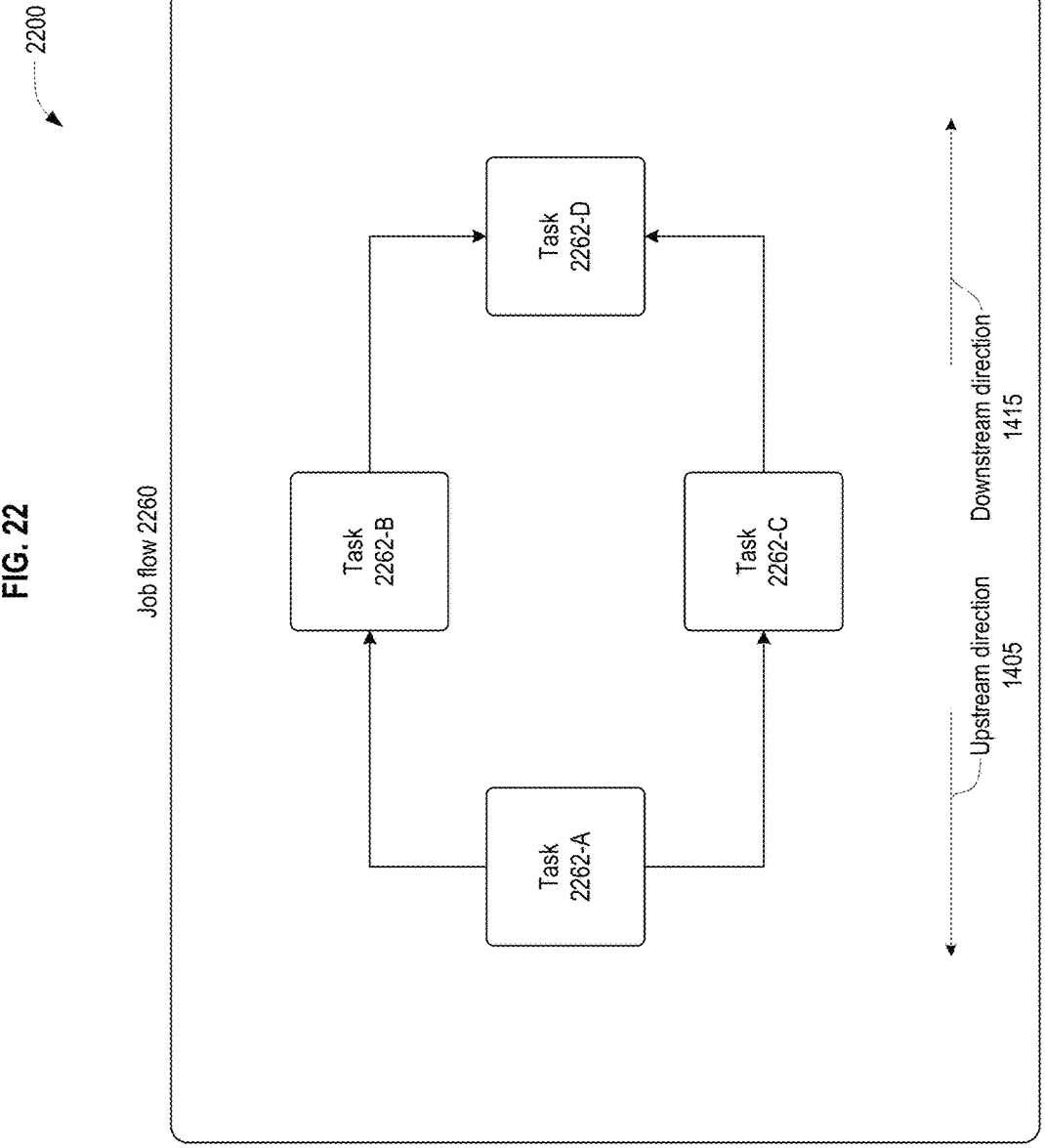
FIG. 22 illustrates a second exemplary job flow, according to some embodiments of the present technology.

FIG. 22 illustrates a second example of a job flow 2260 in environment 2200 that may be representative of various embodiments. In environment 2200, job flow 2260 may include an upstream direction 1405, a downstream direction 1415, and a set of tasks 2262-A, 2262-B, 2262-C, 2262-D. As shown in FIG. 22, task 2262-A may be connected in parallel to task 2262-B and task 2262-C in the downstream direction 1415 and task 2262-D may be connected in parallel to task 2262-B and task 2262-C in the upstream direction 1405. In various embodiments, the same or a similar analysis described with respect to job flow 1402 may be performed on job flow 2260. For example, LPE and TRUE value may be computed for each of the tasks in job flow 2260 and used to generate a job queue that minimizes the makespan of job flow 2260. In various embodiments, the analysis of job flow 2260 may include one or more steps illustrated and described with respect to FIGS. 25A and 25B. Embodiments are not limited in this context.

Generally, the analysis of a job flow in one or more embodiments described herein may proceed according to the following process flow [annotated] with respect to job flow 2260 of FIG. 22.

1. Take a list of all tasks in the job flow. [task 2262-A, task 2262-B, task 2262-C, task 2262-D]
2. Take a list of all distinct dependencies across the entire job flow. [task 2262-A, task 2262-B, task 2262-C]
3. Find the subset of tasks in #1 that are not in #2. These are the end of chain jobs or possible ends to the job flow. [task 2262-D]
4. Loop through the end chain jobs. For each one hold duration and recurse toward the beginning of the job flow along all possible paths.
    a. Add durations and store as needed as TRUE values. [TRUE value for task 2262-D is duration of task 2262-D; TRUE value for task 2262-B is TRUE value for task 2262-D+duration of task 2262-B; TRUE value for task 2262-C is TRUE value for task 2262-D+duration of task 2262-C
    b. When a duration is already present for a job from previous loop/recurse cycle, take the max of the previous value and the current value for moving forward. [TRUE value for task 2262-A is max of TRUE value for task 2262-B and TRUE value for task 2262-C]
5. Sort list of tasks by descending TRUE values. [task 2262-A at the top, task 2262-D at the bottom]
6. Run the job flow according to the sorted order from #5 but also considering dependencies. [cannot assign task 2262-B or task 2262-C until task 2262-A is completed; cannot assign task 2262-D until task 2262-B and task 2262-C are completed]

Many embodiments, including those implemented in a computer programming code, such as Python, may proceed according to the following process flow annotated with Python code snippets.

1. Read in past durations—code below reads several files and makes averages.

```
# find previous run time files and load into dictionary
past_durations={ }
times_per_jobs={ }
prev_dur_file_list=[os.path.basename(x) for x in glob.glob
  (logpath+'*'+suffix_to_find)]
num_dur_files=len(prev_dur_file_list)
if num_dur_files>0: # If one or more past timing files are
 available
  try:
    prev_dur_file_list.sort(reverse=True) # sort the files (file-
      name inc dates)
    for durfile in range(0, min(num_dur_files, optimize_con-
      currency_files)):
      with open(logpath+prev_dur_file_list[durfile]) as f:
        for l in f:
          durfilejob=l.strip( ).split("|")[0]
          if durfilejob in past_durations:
            times_per_jobs[durfilejob]+=1
            past_durations[durfilejob]+=int(l.strip(  ).split
              ("|")[1])
          else:
            times_per_jobs[durfilejob]=1
            past_durations[durfilejob]=int(l.strip(  ).split
              ("|")[1])
    for key in past_durations:
      past_durations[key]=past_durations[key]/times_per_
        jobs[key]
```

2. Find subset of jobs, or tasks, not in distinct dependencies lies. These are end of chain jobs or possible ends to the schedule.

```
end_of_chain=
for x in jobs:
  if x not in dependencies:
    end_of_chain.append(x)
```

3. Loop through end of chain jobs. For each one hold duration and recurse toward the beginning of the job flow down all possible paths.
    a. Add durations and store as needed as TRUE values.
    b. When a duration is already present for a job from previous loop/recurse cycle take the max of the previous value and current value for moving forward.

```
# used to crawl from the end of a schedule to the beginning
while adding past durations to get time remaining
def recurseForward(x, recurseTime):
  if x.depend[0].upper( ) is not 'NONE':
    for dep in x.depend:
      for s in schedule:
        if sch_st_key(s)==dep:
          tempTime=past_durations[dep]+recurseTime
          if time remaining[dep]<tempTime:
            time remaining[dep]=tempTime
          recurseForward(s, time_remaining[dep])
# initialize time remaining values to 0
time_remaining=
for x in schedule:
  time_remaining[sch_st_key(x)]=0
for job in schedule:
  if sch_st_key(x) in end_of_chain:
    time_remaining[sch_st_key(x)]=pair_timing(sch_st_key
      (x))  recurseForward(x,  time_remaining[sch_st_key
      (x)])
```

4. Sort list of jobs by descending TRUE values.
schedule.sort(key=lambda Entry: time remaining[sch_st_key(Entry)], reverse=True)
5. Run task assignor. Task assignor follows sorted order from #4, but also considers dependencies.
Kick-off job code
for job in schedule:
   if dependencies met and worker available:
   start(job)
   . . .
   #remove started job from schedule
   #increase # of known workers active In one or more embodiments described herein, analysis of job flow 2260 to produce a job queue may include performance of one or more of the following operations, such as by an apparatus comprising a processor and a storage to store instructions that, when executed by the processor, cause the processor to perform one or more of the following operations. The following operations can be involved. Identify a job flow with an upstream direction and a downstream direction, the job flow comprising a set of tasks associated with performance of a job, the set of tasks to include first, second, third, and fourth tasks, wherein the first task is connected in parallel to the second and third tasks in the downstream direction and the fourth task is connected in parallel to the second and third tasks in the upstream direction. Identify job data comprising task data for each task in the job flow, the task data for each task in the job flow to include a set of task dependencies and a task duration, wherein the set of task dependencies for the first task includes an empty set, the set of task dependencies for the second and third task include the first task and the set of task dependencies for the fourth task includes the second and third tasks. Determine a list of dependency tasks based on the set of task dependencies for each task in the job flow, wherein the list of dependency tasks include the first, second, and third tasks. Identify a set of end chain tasks comprising one or more tasks in the job flow and excluded from the list of dependency tasks, wherein the set of end chain tasks include the fourth task. Compute a set of paths to end for each task in the job flow, the set of paths to end for a respective task comprising each possible route from the respective task to a respective end chain task in the set of end chain tasks, wherein the set of paths to end for the first task includes a first path comprising the first, second, and fourth tasks and a second path comprising the first, third, and fourth tasks, the set of paths to end for the second task includes a third path comprising the second, and fourth tasks, the set of paths to end for the third task includes a fourth path comprising the third and fourth tasks, and the set of paths to end for the fourth task includes a fifth path comprising the fourth task. Compute a total duration for each path in each set of paths to end for each task in the job flow, the total duration for each respective path in a respective set of paths comprising a summation of task durations along the respective path, wherein the total duration for the first path comprises the summation of task durations for the first, second, and fourth tasks and the total duration for the second path comprises the summation of task durations for the first, third, and fourth tasks, the total duration for the third path comprises the summation of task durations for the second and fourth tasks, the total duration for the fourth path comprises the summation of task durations for the third and fourth tasks, and the total duration for the fifth path comprises the task duration for the fourth task. Determine a time remaining until end (TRUE) value for each task in the job flow, the TRUE value for the respective task comprising a value of a maximum total duration between paths in the respective set of paths to end, wherein the TRUE value for the first task comprises the value of a maximum between the total duration for the first path and the total duration for the second path, the TRUE value for the second task comprises the total duration of the third path, the TRUE value for the third task comprises the total duration of the fourth path, and the TRUE value for the fourth task comprises the total duration of the fifth path. Generate a job queue based on the TRUE value for each task in the job flow, the job queue comprising a list of tasks in the job flow ordered from a largest TRUE value to a smallest TRUE value, wherein the first task is higher than the second, third, and fourth tasks in the job queue and the fourth task is lower than the first, second, and third tasks in the job queue.

In some embodiments, operations may include determining the TRUE value for the second and third tasks based on the TRUE value for the fourth task may be performed. In various embodiments, operations comprising determine the TRUE value for the first task based on a maximum TRUE value between the TRUE value for the second task and the TRUE value for the third task may be performed. In many embodiments, operations comprising determine a longest path to end (LPE) for each task in the job flow, the LPE for the respective task comprising a path with the maximum total duration for the respective set of paths to end, wherein the LPE for the first task comprises the path with the maximum total duration between the first path and the second path, the LPE for the second task comprises the third path, the LPE for the for the third task comprises the fourth path, and the LPE for the fourth task comprises the fifth path may be performed. In many such embodiments, operations comprising identify the LPE for the first task as a critical path for the job flow may be performed.

In one or more embodiments, operations comprising assign a top task from the job queue to a first executor for performance; determine an updated TRUE value for each remaining task in the job flow upon completion of the top task by the first executor; generate an updated job queue based on the updated TRUE value for each task in the job flow; and assign an updated top task from the updated job queue to a second executor for performance may be performed. In various embodiments operations comprising: determine all task dependencies for a highest unassigned task in the task queue have not been met; determine all task dependencies for a next highest unassigned task in the task queue have been met in response to determination all task dependencies for the highest unassigned task in the task queue have not been met; and assign the next highest unassigned task in the task queue to an executor for performance may be performed.

In some embodiments, the first and second paths are comprised in Euler paths of the job flow. In various embodiments, operations comprising determine the task duration for the first task based on a duration of a previous performance of the first task may be performed. In several embodiments operations comprising determine a makespan for the job, the makespan comprising a duration to perform the job with a defined number of executors based on the job queue may be performed.

Figure 23:
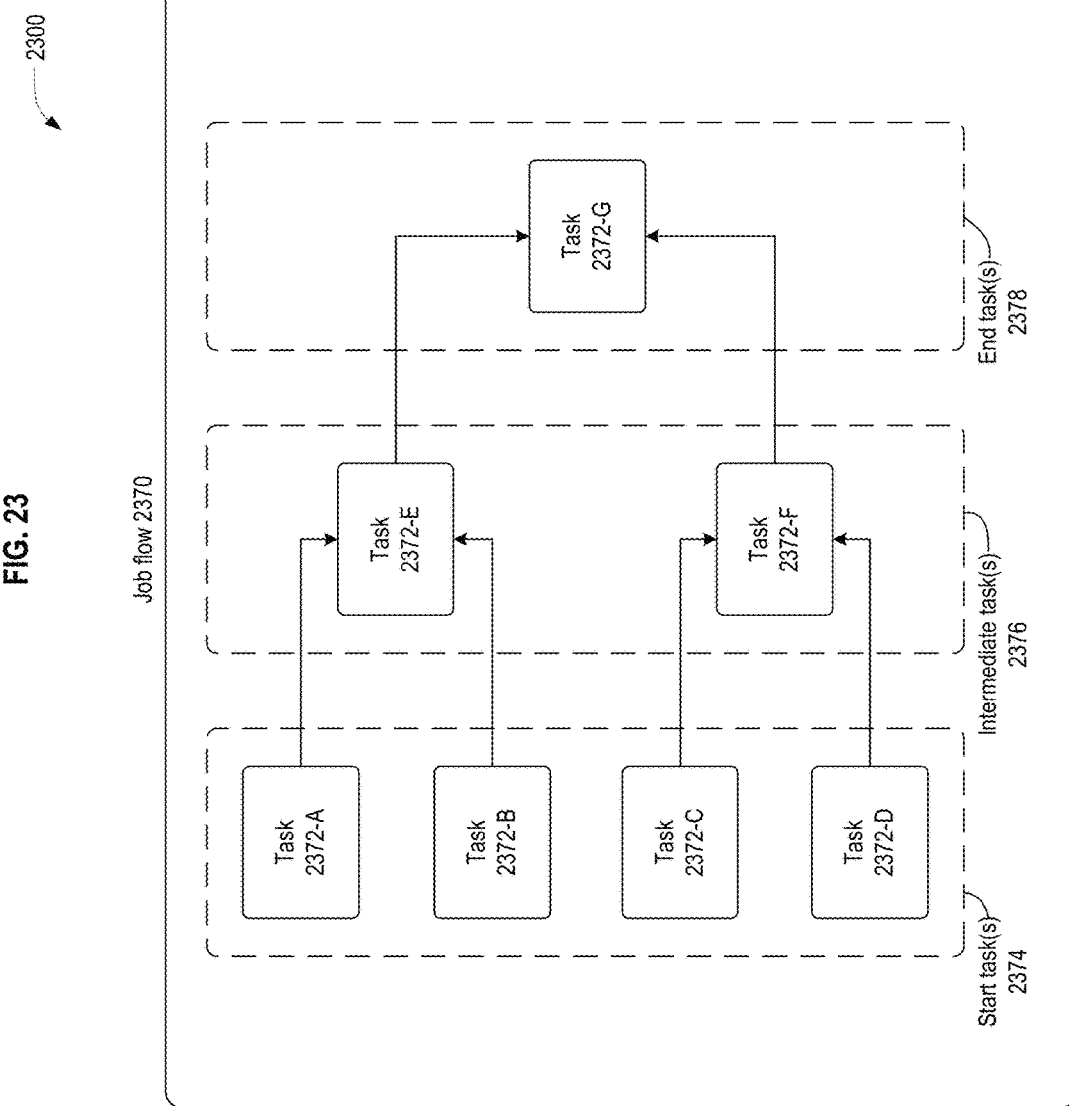
FIG. 23 illustrates a third exemplary job flow, according to some embodiments of the present technology.

FIG. 23 illustrates a third example of a job flow 2370 in environment 2300 that may be representative of various embodiments. In environment 2300, job flow 2370 may comprise a set of start tasks 2374 that include tasks 2372-A, 2372-B, 2372-C, 2372-D, a set of intermediate tasks 2376 that include tasks 2372-E, 2372-F, and a set of end tasks 2378 that include task 2372-G. As shown in FIG. 23, task 2372-A and task 2372-B may connect in parallel to task 2372-E, task 2372-C and task 2372-D may connect in parallel to task 2372-F, and task 2372-E and task 2372-F may connect in parallel to task 2372-G. In various embodiments, the same or a similar analysis described with respect to job flow 1402 may be performed on job flow 2260. For example, one or more critical paths in job flow 2370 may be identified and performance of tasks along the critical path may be prioritized to minimize the makespan of the job flow 2370. In several embodiments, a list of tasks in job flow 2370 may be optimally ordered, such that after all dependencies are taken into consideration, at any given time (and when possible) one or more task executors (out of all task executors) are working on a task that is on the critical path through the job flow. In many embodiments, when a task on the critical path completes, another task from the critical path is assigned to the newly idle task executor (when more optimal and possible). In various embodiments, the analysis of job flow 2370 may include one or more steps illustrated and described with respect to FIG. 26. Embodiments are not limited in this context.

In one or more embodiments described herein, analysis of job flow 2370 to produce a job queue may include performance of one or more of the following operations, such as by an apparatus comprising a processor and a storage to store instructions that, when executed by the processor, cause the processor to perform one or more of the following operations. Identify a job flow comprising a set of tasks for performance, each task in the job flow associated with a duration, and the set of tasks to include a set of start tasks, a set of intermediate tasks, and a set of end tasks. Identify a set of dependencies for each intermediate task and each end task in the set of tasks, wherein each dependency in a respective set of dependencies for a respective task indicates a separate task that requires completion before performance of the respective task. Determine a set of paths for the job flow, each path in the set of paths to begin with a start task in the set of start tasks, include at least one task in the set of intermediate tasks, and conclude with an end task in the set of end tasks, wherein each path in the set of paths includes a unique set of tasks from the set of tasks in the job flow and each task in the set of tasks is included in at least one path in the set of paths, and wherein at least one intermediate task in each respective path depends from the start task of the respective path and the end task in each respective path depends from at least one intermediate path in the respective path. Calculate a path duration for each path in the set of paths, wherein the path duration for each path in the set of paths includes a summation of the durations for each task in a respective path. Identify the path in the set of paths with a highest path duration as a critical path in the job flow. Assign the critical path as a longest path to end (LPE) for the start task from the critical path. Assign the path duration of the critical path as a time remaining until end (TRUE) value for the start task from the critical path. Identify the start task from the critical path as starting task for performance of the job flow.

In some embodiments, operations comprising assign the start task from the critical path to a first task executor for performance before assigning any other task in the set of tasks for performance may be performed. In various embodiments, operations comprising assign a next task after the start task from the critical path to a second task executor for performance after completion of the start task from the critical path by the first task executor may be performed. In many embodiments, operations comprising assign a second start task from the set of start tasks to a second task executor for performance in parallel with performance of the start task from the critical path may be performed. In many such embodiments, operations comprising assign another task from the set of tasks to a second task executor for performance in parallel with performance of the start task from the critical path, wherein the other task is not on the critical path may be performed.

In various embodiments, operations comprising confirm the respective set of dependencies have been satisfied before assigning the respective task to a task executor for performance may be performed. In some embodiments, operations comprising generate a job queue with a top and a bottom, the job queue comprising an ordered list of the set of tasks with the start task from the critical path at the top of the job queue and the end task from the critical path at the bottom of the job queue may be performed. In some such embodiments, the job queue includes the set of dependencies for each intermediate task and each end task in the set of tasks. In further such embodiments, operations comprising assign a highest task in the job queue with all dependencies satisfied to a task executor when the task executor become available may be performed.

In one or more embodiments, operations comprising perform a trial run for each task in the set of tasks to determine the duration for each task in the set of tasks may be performed.

Figure 24A:
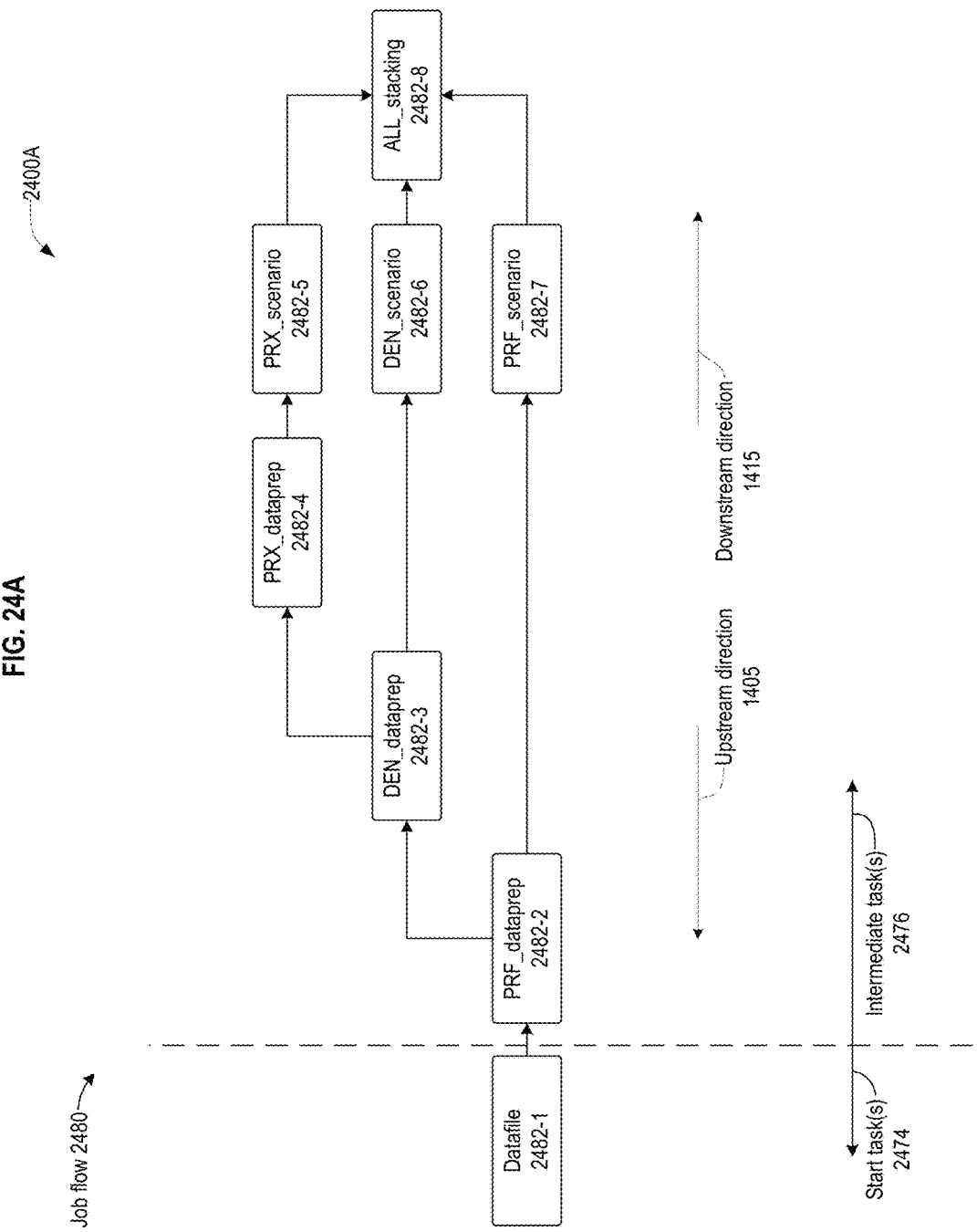
FIGS. 24A and 24B illustrate a fourth exemplary job flow, according to some embodiments of the present technology.
Figure 24B:
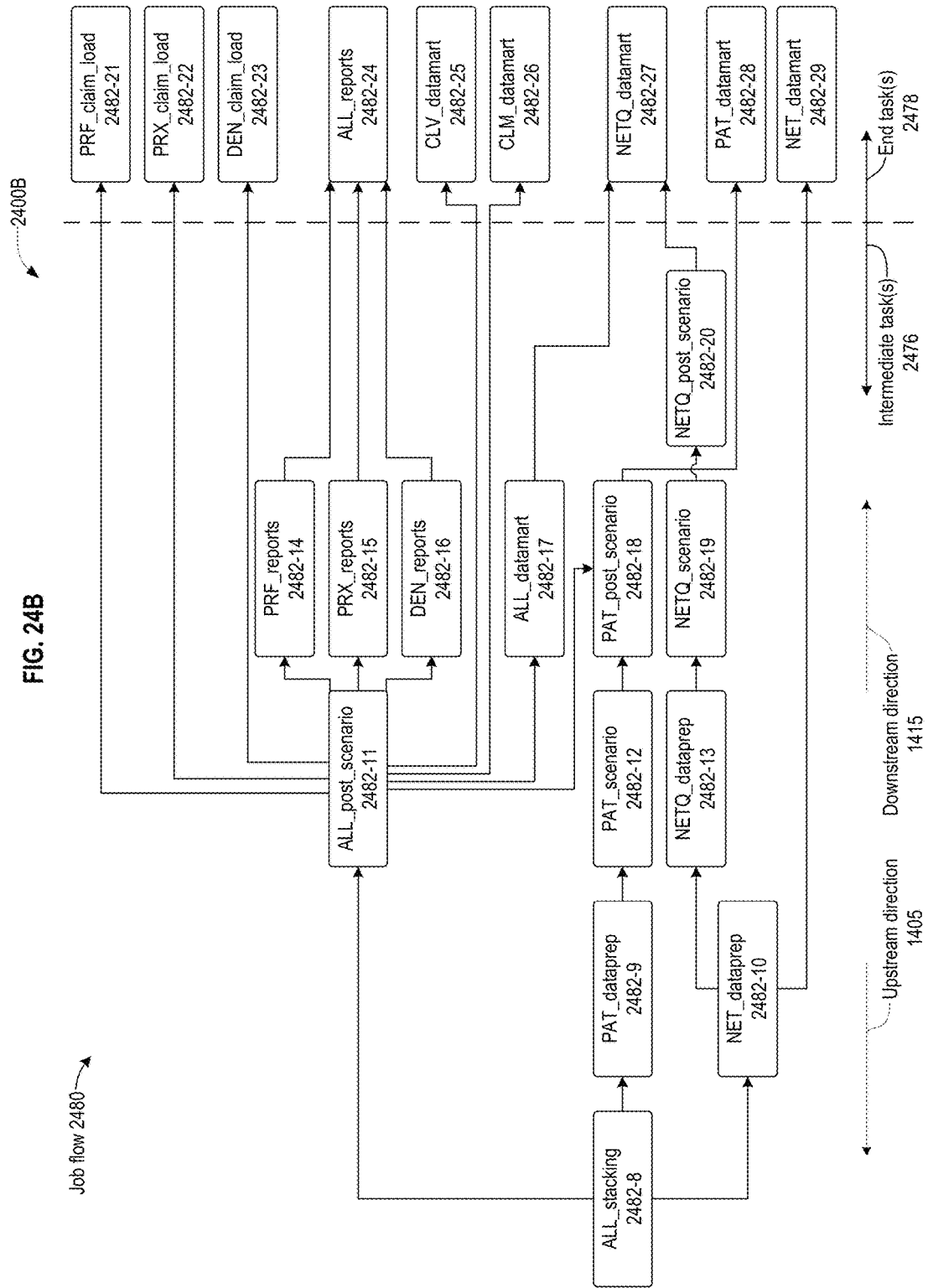

FIGS. 24A and 24B illustrate a fourth example of a job flow 2480 in environments 2400A, 2400B that may be representative of various embodiments. In some embodiments, job flow 2480 may include a more complex illustration of a possible job flow that one or more techniques or functionalities described herein can be applied to. Accordingly, it will be appreciated that the techniques and functionalities described herein can be applied to job flows of arbitrary complexity without departing from the scope of this disclosure. Embodiments are not limited in this context.

Figure 25A:
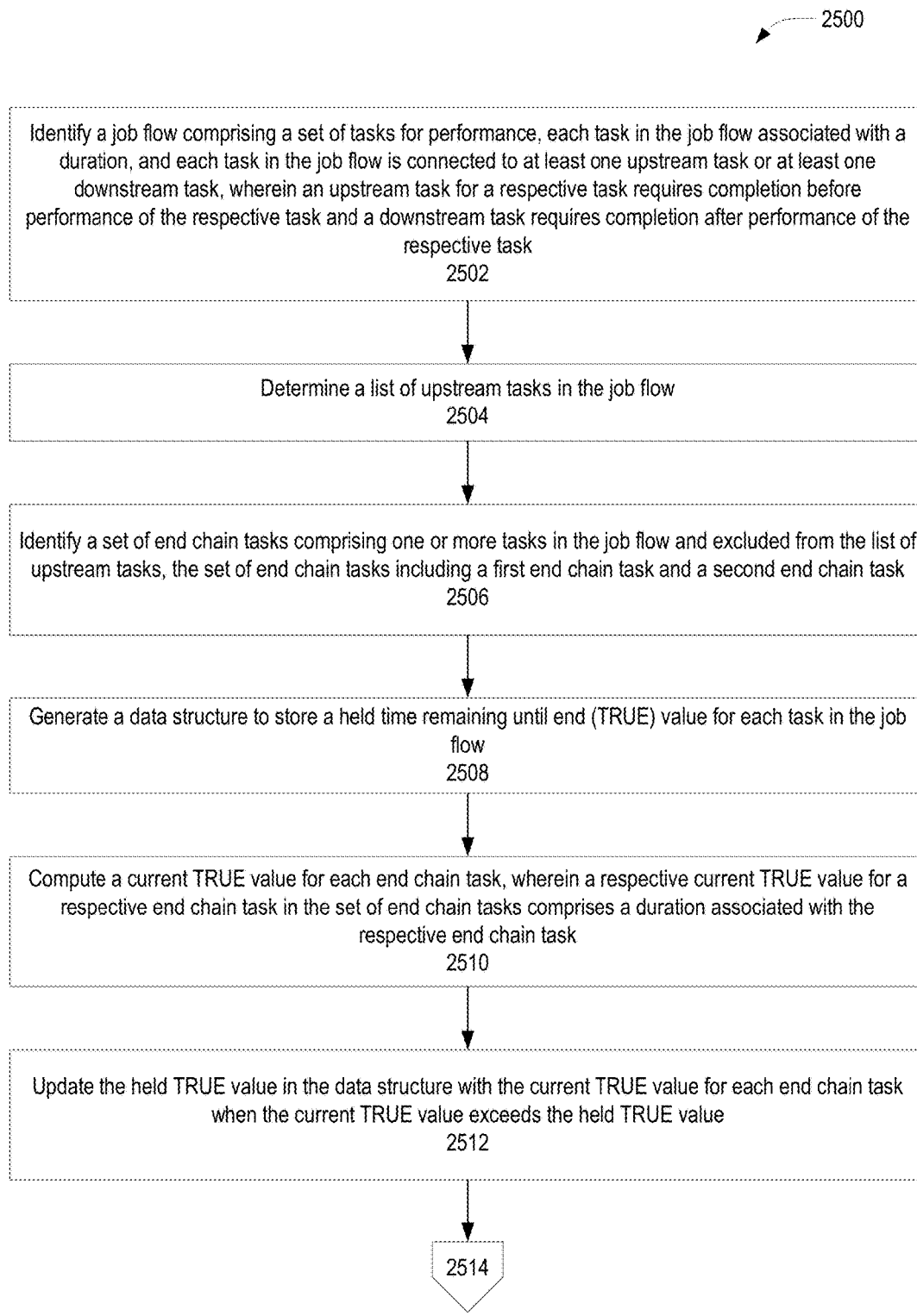
FIGS. 25A and 25B illustrate an exemplary logic flow, according to some embodiments of the present technology.
Figure 25B:
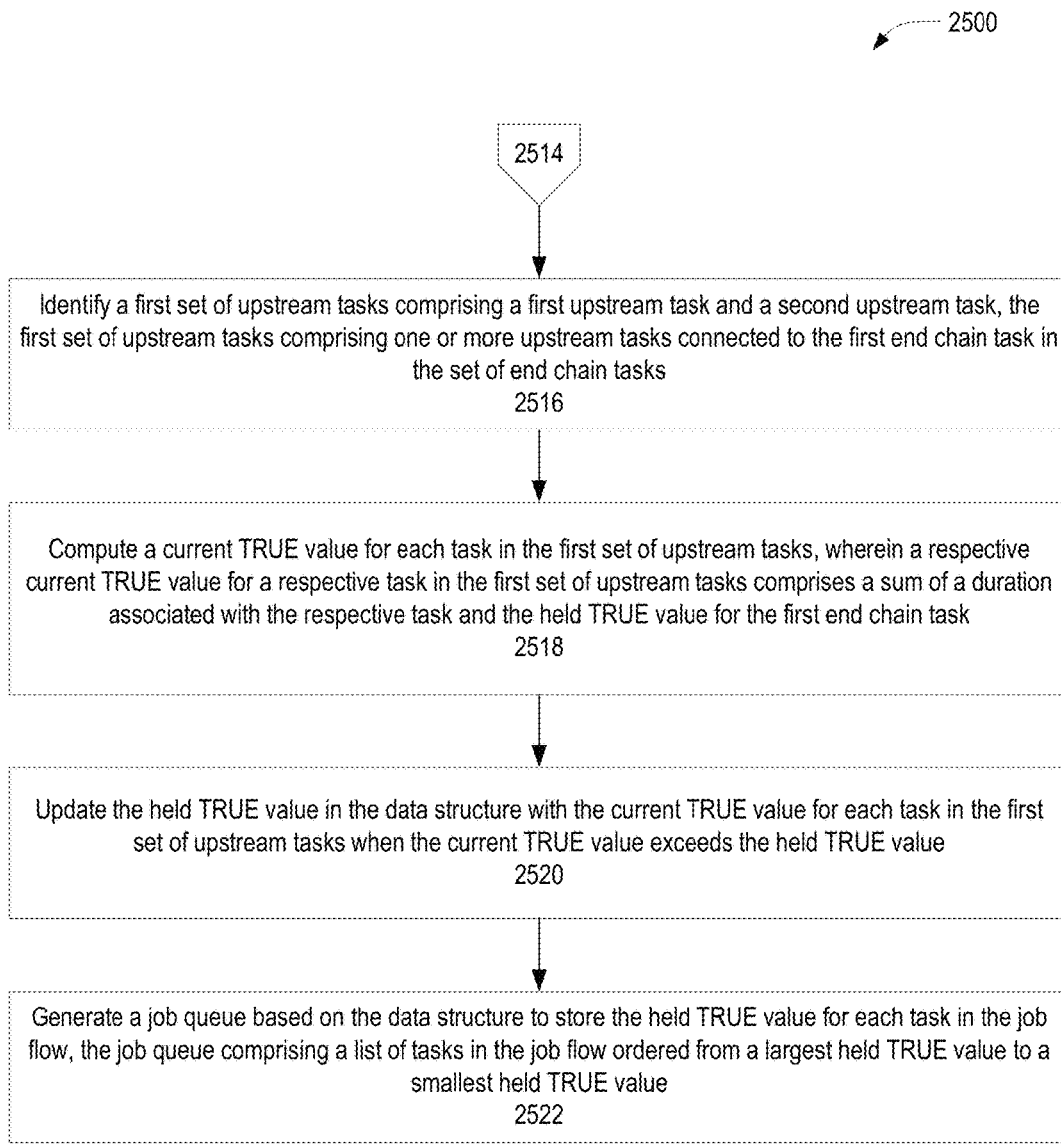

FIGS. 25A and 25B illustrate an embodiment of a logic flow 2500. The logic flow 2500 may be representative of some or all of the operations executed by one or more embodiments described herein. More specifically, the logic flow 2500 may illustrate operations performed by processing or logic circuitry used to implement one or more components and/or functionalities described herein, such as job flow processing system 1301, job analyzer 1304, scheduler 1308, and/or task assignor 1312. In one or more embodiments, these operations may be performed in conjunction with optimizing a makespan for a job flow. Embodiments are not limited in this context.

In the illustrated embodiment shown in FIG. 25, the logic flow 2500 may begin at block 2502. At block 2502, "identify a job flow comprising a set of tasks for performance, each task in the job flow associated with a duration, and each task in the job flow is connected to at least one upstream task or at least one downstream task, wherein an upstream task for a respective task requires completion before performance of the respective task and a downstream task requires completion after performance of the respective task" a job flow comprising a set of tasks for performance may be identified. In many embodiments, each task in the job flow may be connected to at least one upstream task or at least one downstream task, wherein an upstream task for a respective task requires completion before performance of the respective task and a downstream task requires completion after performance of the respective task. For example, job flow 2260 may include tasks 2262-A, 2262-B, 2262-C, 2262-D.

Further, task 2262-A may be an upstream task for tasks 2262-B, 2262-C and task 2262-D may be a downstream task for tasks 2262-B, 2262-C.

Proceeding to block 2504 "determine a list of upstream tasks in the job flow" a list of upstream tasks in the job flow may be determined. For instance, the list of upstream tasks in job flow 2260 may include tasks 2262-A, 2262-B, 2262-C. Continuing to block 2506 "identify a set of end chain tasks comprising one or more tasks in the job flow and excluded from the list of upstream tasks, the set of end chain tasks including a first end chain task and a second end chain task" a set of end chain tasks may be identified. For example, the list of end chain tasks for job flow 2260 may include task 2262-D.

At block 2508 "generate a data structure to store a held time remaining until end (TRUE) value for each task in the job flow" a data structure to store a held TRUE value for each task in the job flow may be generated. In some embodiments, job analyzer 1304 may generate the data structure, such as in job data 1506. Proceeding to block 2510 "compute a current TRUE value for each end chain task, wherein a respective current TRUE value for a respective end chain task in the set of end chain tasks comprises a duration associated with the respective end chain task" a current TRUE value may be computed for each end chain task. For example, a current TRUE value for task 2262-D of job flow 2260 may be computed.

Continuing to block 2512 "update the held TRUE value in the data structure with the current TRUE value for each end chain task when the current TRUE value exceeds the held TRUE value" the held TRUE value in the data structure may be updated with the current TRUE value when the current TRUE value exceeds the held TRUE value. For example, the held TRUE value for task 2262-D may be initialized to zero and the current TRUE value for task 2262-D may be computed as the task duration for task 2262-D. Accordingly, the held true value for task 2262-D may be updated with the current TRUE value for task 2262-D. At block 2514, the logic flow 2500 may proceed from FIG. 25A to FIG. 25B.

At block 2516 "identify a first set of upstream tasks comprising a first upstream task and a second upstream task, the first set of upstream tasks comprising one or more upstream tasks connected to the first end chain task in the set of end chain tasks" a set of upstream tasks for the first end chain task may be identified. For example, the set of upstream tasks for task 2372-G of job flow 2370 may include tasks 2372-E, 2372-F. Proceeding to block 2518 "compute a current TRUE value for each task in the first set of upstream tasks, wherein a respective current TRUE value for a respective task in the first set of upstream tasks comprises a sum of a duration associated with the respective task and the held TRUE value for the first end chain task" a current TRUE value for each task in the first set of upstream tasks may be computed.

Proceeding to block 2520 "update the held TRUE value in the data structure with the current TRUE value for each task in the first set of upstream tasks when the current TRUE value exceeds the held TRUE value" the held TRUE value in the data structure may be updates with the current TRUE value for each task in the first set of upstream tasks when the current TRUE value exceeds the held TRUE value. At block 2522 "generate a job queue based on the data structure to store the held TRUE value for each task in the job flow, the job queue comprising a list of tasks in the job flow ordered from a largest held TRUE value to a smallest held TRUE value" a job queue comprising a list of tasks in the job flow ordered from a largest held TRUE value to a smallest held TRUE value may be generated. For example, job queue 1610 may be generated.

In various embodiments, one or more functionalities or components described herein may be implemented, although not necessarily explicitly shown, with processing circuitry, logic circuitry, or other processors which may include any of a wide variety of commercially available processors. Further, one or more of these processors may include multiple processors, a multi-threaded processor, a multi-core processor (whether the multiple cores coexist on the same or separate dies), GPUs. and/or a multi-processor architecture of some other variety by which multiple physically separate processors are linked.

However, in a specific embodiment, one or more of the processing circuitry and logic circuitry may be selected to efficiently implement one or more techniques or features described herein. Alternatively, or additionally, the processors of one or more node devices may be selected to efficiently perform one or more operations described herein. In some embodiments, one or more operations described herein may be performed at least partially in parallel. By way of example, one or more of processing circuitries, logic circuitries, and other processors may incorporate a single-instruction multiple-data (SIMD) architecture, may incorporate multiple processing pipelines, and/or may incorporate the ability to support multiple simultaneous threads of execution per processing pipeline.

In various embodiments, one or more portions of the processing or logic flows described herein, including the components of which each is composed, may be selected to be operative on whatever type of processor or processors that are selected to implement one or more components, techniques, or embodiments described herein. In various embodiments, each of these one or more portions of the processing or logic flows described herein may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for one or more processing circuitry, logic circuitry, or other processors utilized. Where one or more device drivers are included, those device drivers may provide support for any of a variety of other components, whether hardware or software components, described herein.

In various embodiments, each of the computer-readable storages or memory required (although not necessarily explicitly shown) for processing circuitry, logic circuitry, or other processors to implement functionalities described herein may be based on any of a wide variety of information storage technologies, including volatile technologies requiring the uninterrupted provision of electric power, and/or including technologies entailing the use of machine-readable storage media that may or may not be removable. In many embodiments, these storages may include one or more non-transitory computer-readable mediums. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid-state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller). However, in a specific embodiment, the data may be stored with a redundant array of independent discs (RAID) of a RAID level selected to provide fault tolerance to prevent loss of one or more of these datasets and/or to provide increased speed in accessing one or more of these datasets.

In various embodiments, one or more interfaces (e.g., a graphical user interface (GUI)) may be used in conjunction with carrying out techniques or features described herein. In various such embodiments, the one or more interfaces may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. In various embodiments, displays, such as for displaying a GUI, may be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, one or more of the interfaces may be a touchscreen display.

In various embodiments, one or more interfaces described or included herein may include one or more network interfaces that employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. However, in a specific embodiment, one or more interfaces may be implemented with multiple copper-based or fiber-optic based network interface ports to provide redundant and/or parallel pathways in exchanging data.

In various embodiments, the processing and/or storage resources of one or more components described herein, may be divided among the multiple systems. In various such embodiments, one or more API architectures may support communications among the multiple systems. The one or more API architectures may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of data among multiple systems is not dependent on, nor constrained by, existing API architectures and/or supporting communications protocols. More broadly, there is nothing in the manner in which the data may be organized in storage, transmission and/or distribution via one or more interfaces described herein that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising a processor and a storage to store instructions that, when executed by the processor, cause the processor to perform operations comprising:
    identify a job flow comprising a set of tasks for performance, each task in the job flow associated with a duration, and each task in the job flow is connected to at least one upstream task or at least one downstream task, wherein an upstream task for a respective task requires completion before performance of the respective task and a downstream task requires completion after performance of the respective task;

determine a list of upstream tasks in the job flow;
identify a set of end chain tasks comprising one or more tasks in the job flow and excluded from the list of upstream tasks, the set of end chain tasks including a first end chain task and a second end chain task;
generate a data structure to store a held time remaining until end (TRUE) value for each task in the job flow;
compute a current TRUE value for each end chain task, wherein a respective current TRUE value for a respective end chain task in the set of end chain tasks comprises a duration associated with the respective end chain task;
update the held TRUE value in the data structure with the current TRUE value for each end chain task when the current TRUE value exceeds the held TRUE value;
identify a first set of upstream tasks comprising a first upstream task and a second upstream task, the first set of upstream tasks comprising one or more upstream tasks connected to the first end chain task in the set of end chain tasks;
compute a current TRUE value for each task in the first set of upstream tasks, wherein a respective current TRUE value for a respective task in the first set of upstream tasks comprises a sum of a duration associated with the respective task and the held TRUE value for the first end chain task;
update the held TRUE value in the data structure with the current TRUE value for each task in the first set of upstream tasks when the current TRUE value exceeds the held TRUE value; and
generate a job queue based on the data structure to store the held TRUE value for each task in the job flow, the job queue comprising a list of tasks in the job flow ordered from a largest held TRUE value to a smallest held TRUE value.

2. The apparatus of claim 1, wherein the processor is caused to perform operations comprising:
identify a second set of upstream tasks including the second upstream task and a third upstream task, the second set of upstream tasks comprising one or more upstream tasks connected to the second end chain task in the set of end chain tasks;
compute a current TRUE value for each task in the second set of upstream tasks, wherein a respective current TRUE value for a respective task in the second set of upstream tasks comprises a sum of a duration associated with the respective task and the held TRUE value for the second end chain task; and
update the held TRUE value in the data structure with the current TRUE value for each task in the second set of upstream tasks when the current TRUE value exceeds the held TRUE value.

3. The apparatus of claim 2, wherein the processor is caused to perform operations comprising replace the held TRUE value in the data structure with the current TRUE value based on a comparison of the current value for the second upstream task and the held TRUE value for the second upstream task to update the held TRUE value in the data structure with the current TRUE value for each task in the second set of upstream tasks when the current TRUE value exceeds the held TRUE value.

4. The apparatus of claim 1, wherein the processor is caused to perform operations comprising:
select a next task for assignment from the job queue;
identify an available task executor in a set of task executors; and
assign the next task for assignment to the available task executor for performance.

5. The apparatus of claim 1, the job queue including an indication of each upstream task of each task in the job flow.

6. The apparatus of claim 5, wherein the processor is caused to perform operations comprising assign a highest task in the job queue with all upstream tasks completed to a task executor when the task executor become available.

7. The apparatus of claim 1, wherein the processor is caused to perform operations comprising perform a trial run for each task in the set of tasks to determine the duration for each task in the set of tasks.

8. The apparatus of claim 1, wherein the processor is caused to perform operations comprising compute a makespan for the job flow, the makespan comprising a duration to perform the job flow with a defined number of executors based on the job queue.

9. The apparatus of claim 8, wherein the processor is caused to perform operations comprising recompute the makespan for the job flow based on a change in the defined number of executors.

10. The apparatus of claim 1, wherein the processor is caused to perform operations comprising identify a critical path for the job flow that begins with the task with the largest held TRUE value.

11. A computer-implemented method, comprising:
identifying a job flow comprising a set of tasks for performance, each task in the job flow associated with a duration, and each task in the job flow is connected to at least one upstream task or at least one downstream task, wherein an upstream task for a respective task requires completion before performance of the respective task and a downstream task requires completion after performance of the respective task;
determining a list of upstream tasks in the job flow;
identifying a set of end chain tasks comprising one or more tasks in the job flow and excluded from the list of upstream tasks, the set of end chain tasks including a first end chain task and a second end chain task;
generating a data structure to store a held time remaining until end (TRUE) value for each task in the job flow;
computing a current TRUE value for each end chain task, wherein a respective current TRUE value for a respective end chain task in the set of end chain tasks comprises a duration associated with the respective end chain task;
updating the held TRUE value in the data structure with the current TRUE value for each end chain task when the current TRUE value exceeds the held TRUE value;
identifying a first set of upstream tasks comprising a first upstream task and a second upstream task, the first set of upstream tasks comprising one or more upstream tasks connected to the first end chain task in the set of end chain tasks;
computing a current TRUE value for each task in the first set of upstream tasks, wherein a respective current TRUE value for a respective task in the first set of upstream tasks comprises a sum of a duration associated with the respective task and the held TRUE value for the first end chain task;
updating the held TRUE value in the data structure with the current TRUE value for each task in the first set of upstream tasks when the current TRUE value exceeds the held TRUE value; and
generating a job queue based on the data structure to store the held TRUE value for each task in the job flow, the job queue comprising a list of tasks in the job flow ordered from a largest held TRUE value to a smallest held TRUE value.

12. The computer-implemented method of claim 11, comprising:
identifying a second set of upstream tasks including the second upstream task and a third upstream task, the second set of upstream tasks comprising one or more upstream tasks connected to the second end chain task in the set of end chain tasks;
computing a current TRUE value for each task in the second set of upstream tasks, wherein a respective current TRUE value for a respective task in the second set of upstream tasks comprises a sum of a duration associated with the respective task and the TRUE value for the second end chain task; and
updating the held TRUE value in the data structure with the current TRUE value for each task in the second set of upstream tasks when the current TRUE value exceeds the held TRUE value.

13. The computer-implemented method of claim 12, comprising replacing the held TRUE value in the data structure with the current TRUE value based on a comparison of the current value for the second upstream task and the held TRUE value for the second upstream task to update the held TRUE value in the data structure with the current TRUE value for each task in the second set of upstream tasks when the current TRUE value exceeds the held TRUE value.

14. The computer-implemented method of claim 11, comprising:
selecting a next task for assignment from the job queue;
identifying an available task executor in a set of task executors; and
assigning the next task for assignment to the available task executor for performance.

15. The computer-implemented method of claim 11, the job queue including an indication of each upstream task of each task in the job flow.

16. The computer-implemented method of claim 15, comprising assigning a highest task in the job queue with all upstream tasks completed to a task executor when the task executor become available.

17. The computer-implemented method of claim 11, comprising performing a trial run for each task in the set of tasks to determine the duration for each task in the set of tasks.

18. The computer-implemented method of claim 11, comprising computing a makespan for the job flow, the makespan comprising a duration to perform the job flow with a defined number of executors based on the job queue.

19. The computer-implemented method of claim 18, comprising recomputing the makespan for the job flow based on a change in the defined number of executors.

20. The computer-implemented method of claim 11, comprising identifying a critical path for the job flow that begins with the task with the largest held TRUE value.

21. A computer-program product tangibly embodied in a non-transitory machine-readable storage medium, the computer-program product including instructions operable to cause a processor to perform operations comprising:
identify a job flow comprising a set of tasks for performance, each task in the job flow associated with a duration, and each task in the job flow is connected to at least one upstream task or at least one downstream task, wherein an upstream task for a respective task requires completion before performance of the respective task and a downstream task requires completion after performance of the respective task;
determine a list of upstream tasks in the job flow;
identify a set of end chain tasks comprising one or more tasks in the job flow and excluded from the list of upstream tasks, the set of end chain tasks including a first end chain task and a second end chain task;
generate a data structure to store a held time remaining until end (TRUE) value for each task in the job flow;
compute a current TRUE value for each end chain task, wherein a respective current TRUE value for a respective end chain task in the set of end chain tasks comprises a duration associated with the respective end chain task;
update the held TRUE value in the data structure with the current TRUE value for each end chain task when the current TRUE value exceeds the held TRUE value;
identify a first set of upstream tasks comprising a first upstream task and a second upstream task, the first set of upstream tasks comprising one or more upstream tasks connected to the first end chain task in the set of end chain tasks;
compute a current TRUE value for each task in the first set of upstream tasks, wherein a respective current TRUE value for a respective task in the first set of upstream tasks comprises a sum of a duration associated with the respective task and the held TRUE value for the first end chain task;
update the held TRUE value in the data structure with the current TRUE value for each task in the first set of upstream tasks when the current TRUE value exceeds the held TRUE value; and
generate a job queue based on the data structure to store the held TRUE value for each task in the job flow, the job queue comprising a list of tasks in the job flow ordered from a largest held TRUE value to a smallest held TRUE value.

22. The computer-program product of claim 21, including instructions operable to cause a processor to perform operations comprising:
identify a second set of upstream tasks including the second upstream task and a third upstream task, the second set of upstream tasks comprising one or more upstream tasks connected to the second end chain task in the set of end chain tasks;
compute a current TRUE value for each task in the second set of upstream tasks, wherein a respective current TRUE value for a respective task in the second set of upstream tasks comprises a sum of a duration associated with the respective task and the TRUE value for the second end chain task; and
update the held TRUE value in the data structure with the current TRUE value for each task in the second set of upstream tasks when the current TRUE value exceeds the held TRUE value.

23. The computer-program product of claim 22, including instructions operable to cause a processor to perform operations comprising replace the held TRUE value in the data structure with the current TRUE value based on a comparison of the current value for the second upstream task and the held TRUE value for the second upstream task to update the held TRUE value in the data structure with the current TRUE value for each task in the second set of upstream tasks when the current TRUE value exceeds the held TRUE value.

24. The computer-program product of claim 21, including instructions operable to cause a processor to perform operations comprising:

select a next task for assignment from the job queue;
identify an available task executor in a set of task executors; and
assign the next task for assignment to the available task executor for performance.

25. The computer-program product of claim 21, the job queue including an indication of each upstream task of each task in the job flow.

26. The computer-program product of claim 25, including instructions operable to cause a processor to perform operations comprising assign a highest task in the job queue with all upstream tasks completed to a task executor when the task executor become available.

27. The computer-program product of claim 21, including instructions operable to cause a processor to perform operations comprising perform a trial run for each task in the set of tasks to determine the duration for each task in the set of tasks.

28. The computer-program product of claim 21, including instructions operable to cause a processor to perform operations comprising compute a makespan for the job flow, the makespan comprising a duration to perform the job flow with a defined number of executors based on the job queue.

29. The computer-program product of claim 28, including instructions operable to cause a processor to perform operations comprising recompute the makespan for the job flow based on a change in the defined number of executors.

30. The computer-program product of claim 21, including instructions operable to cause a processor to perform operations comprising identify a critical path for the job flow that begins with the task with the largest held TRUE value.

* * * * *